United States Patent
Yates et al.

(10) Patent No.: US 9,067,672 B2
(45) Date of Patent: Jun. 30, 2015

(54) PILOT CONTROL SYSTEM WITH PENDENT GRIP

(71) Applicant: Bell Helicopter Textron Inc., Fort Worth, TX (US)

(72) Inventors: Travis L. Yates, Lakeside, TX (US); Bradley D. Linton, Mansfield, TX (US); Chad R. Haugeberg, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 289 days.

(21) Appl. No.: 13/736,135

(22) Filed: Jan. 8, 2013

(65) Prior Publication Data

US 2013/0206898 A1    Aug. 15, 2013

Related U.S. Application Data

(60) Provisional application No. 61/633,405, filed on Feb. 10, 2012.

(51) Int. Cl.
*B64C 13/04* (2006.01)
*B64C 27/56* (2006.01)

(52) U.S. Cl.
CPC ............. *B64C 13/04* (2013.01); *B64C 27/56* (2013.01)

(58) Field of Classification Search
CPC ............. B64C 13/04; G05G 9/047; G05G 2009/04703
USPC ................................. 244/220, 221, 232, 234
See application file for complete search history.

(56) References Cited

U.S. PATENT DOCUMENTS

| | | | |
|---|---|---|---|
| 2,265,683 A | 12/1941 | Bowers et al. |
| 2,424,523 A | 7/1947 | Watter |
| 3,999,726 A | 12/1976 | Carlson |
| 4,012,014 A | 3/1977 | Marshall |
| 4,025,230 A | 5/1977 | Kastan |
| 4,345,195 A | 8/1982 | Griffith et al. |
| 4,913,000 A | 4/1990 | Wyllie |
| 4,914,976 A | 4/1990 | Wyllie |
| 5,137,234 A | 8/1992 | Sakurai |
| 5,149,023 A | 9/1992 | Sakurai et al. |
| 5,156,363 A | 10/1992 | Cizewski |
| 5,379,663 A | 1/1995 | Hara |

(Continued)

FOREIGN PATENT DOCUMENTS

| | | |
|---|---|---|
| CH | 244760 A | 9/1946 |
| CN | 101508314 | 8/2009 |

(Continued)

OTHER PUBLICATIONS

Office Action in related Canadian Application No. 2,804,411, dated Mar. 11, 2014, 3 pages.

(Continued)

*Primary Examiner* — Philip J Bonzell
(74) *Attorney, Agent, or Firm* — Christopher Storm; Bell Helicopter Textron Inc.

(57) ABSTRACT

According to one embodiment, a control assembly includes a post, a grip, and a shaft. The post has a top, a bottom, and a body joining the top to the bottom. The shaft has a first end coupled proximate to the body below the top and a second end opposite the first end coupled to the grip. The shaft positions at least part of the grip directly over the top of the post.

24 Claims, 22 Drawing Sheets

(56) References Cited

U.S. PATENT DOCUMENTS

| | | | |
|---|---|---|---|
| 5,895,012 | A | 4/1999 | Krysinski et al. |
| 6,325,331 | B1 | 12/2001 | McKeown |
| D516,096 | S | 2/2006 | Bergman |
| 8,074,941 | B2 | 12/2011 | Daunois et al. |
| 2003/0106958 | A1 | 6/2003 | Gold et al. |
| 2004/0184915 | A1 | 9/2004 | Kunii et al. |
| 2010/0123045 | A1 | 5/2010 | Grieser |
| 2011/0108674 | A1 | 5/2011 | Gardner |

FOREIGN PATENT DOCUMENTS

| | | |
|---|---|---|
| CN | 101773736 | 7/2010 |
| CN | 102114916 | 7/2011 |
| CN | 102282071 | 12/2011 |
| EP | 352417 A2 | 1/1990 |
| EP | 0352417 | 8/1990 |
| EP | 2088024 A2 | 8/2009 |
| EP | 2119626 A1 | 11/2009 |
| FR | 920283 A | 4/1947 |

OTHER PUBLICATIONS

Office Action in related Canadian Application No. 2,803,524, dated Mar. 31, 2014, 4 pages.
Communication pursuant to Rule 71(3) in related European Application No. 13153192.3, dated Apr. 24, 2014, 70 pages.
Official Action in related European Application No. 13153193.1, dated Apr. 9, 2014, 5 pages.
Official Action in related European Application No. 13153189.9, dated Apr. 9, 2014, 4 pages.
Office Action in related Canadian Application No. 2,804,332, dated Apr. 2, 2014, 2 pages.
Office Action in related Canadian Application No. 2,804,196, dated Apr. 9, 2014, 4 pages.
Office Action in related Canadian Application No. 2,804,801, dated Apr. 9, 2014, 2 pages.
Communication pursuant to Rule 71(3) in related European Application No. 13153191.5, dated Jun. 5, 2014, 62 pages.
Communication pursuant to Rule 71(3) in related European Application No. 13153188.1, dated Jun. 26, 2014, 63 pages.
European Search Report in related European Application No. 13153188.1, dated Sep. 12, 2013, 5 pages.
European Search Report in related European Application No. 13153192.3, dated Sep. 20, 2013, 6 pages.
European Search Report in related European Application No. 13153189.9, dated Jul. 4, 2013, 6 pages.
European Search Report in related European Application No. 13153191.5, dated Jul. 4, 2013, 6 pages.
European Search Report in related European Application No. 13153193.1, dated Jul. 4, 2013, 6 pages.
Office Action in related U.S. Appl. No. 13/736,135, dated Dec. 29, 2014, 47 pages.
Office Action in related U.S. Appl. No. 13/736,147, dated Dec. 29, 2014, 44 pages.
Office Action in related U.S. Appl. No. 13/736,163, dated Dec. 26, 2014, 48 pages.
Office Action in related Chinese Application No. 201310050956.8, dated Jan. 5, 2015, 11 pages.
Office Action in related Canadian Application No. 2,804,411, dated Jan. 15, 2015, 4 pages.
Office Action in related Chinese Application No. 201310050976.5, dated Dec. 17, 2014, 7 pages.
Office Action in related Chinese Application No. 201310050922.9, dated Dec. 2, 2014, 10 pages.
Office Action in related Chinese Application No. 201310050875.8, dated Dec. 2, 2014, 9 pages.
Office Action in related Chinese Application No. 201310050959.1, dated Dec. 24, 2014, 5 pages.

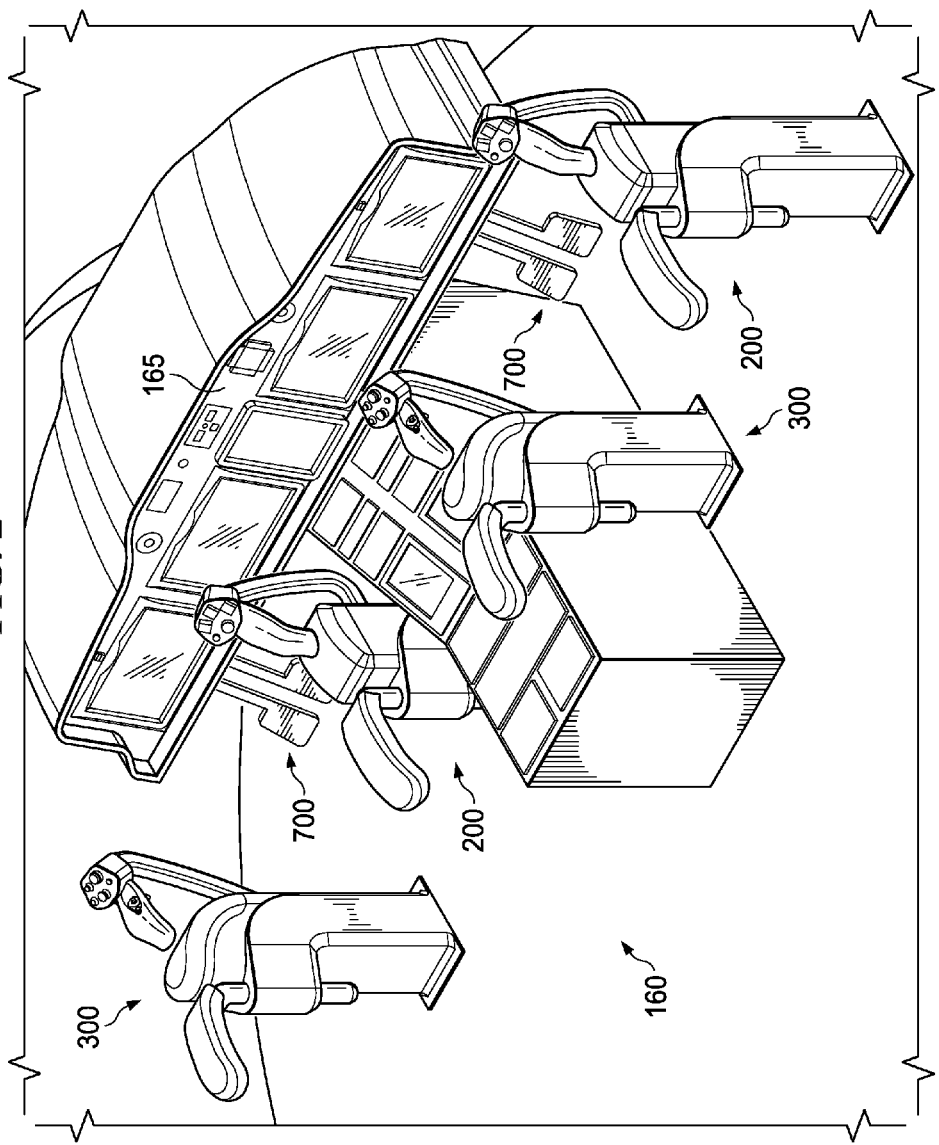

PILOT CONTROL SYSTEM WITH PENDENT GRIP

RELATED APPLICATIONS

Pursuant to 35 U.S.C. §119 (e), this application claims priority to U.S. Provisional Patent Application Ser. No. 61/663,405, entitled CYCLIC/COLLECTIVE CONTROL ASSEMBLIES, filed Feb. 10, 2012. U.S. Provisional Patent Application Ser. No. 61/663,405 is hereby incorporated by reference.

TECHNICAL FIELD

This invention relates generally to aircraft flight control systems, and more particularly, to a pilot control system with a pendent grip.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to improve pilot control of an aircraft. A technical advantage of one embodiment may include the capability to simplify installation of pilot control systems in an aircraft. A technical advantage of one embodiment may include the capability to improve pilot comfort during operation of an aircraft.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 2 shows a cockpit configuration of the rotorcraft of FIG. 1 according to one example embodiment;

DETAILED DESCRIPTION OF THE DRAWINGS

Figure 1:
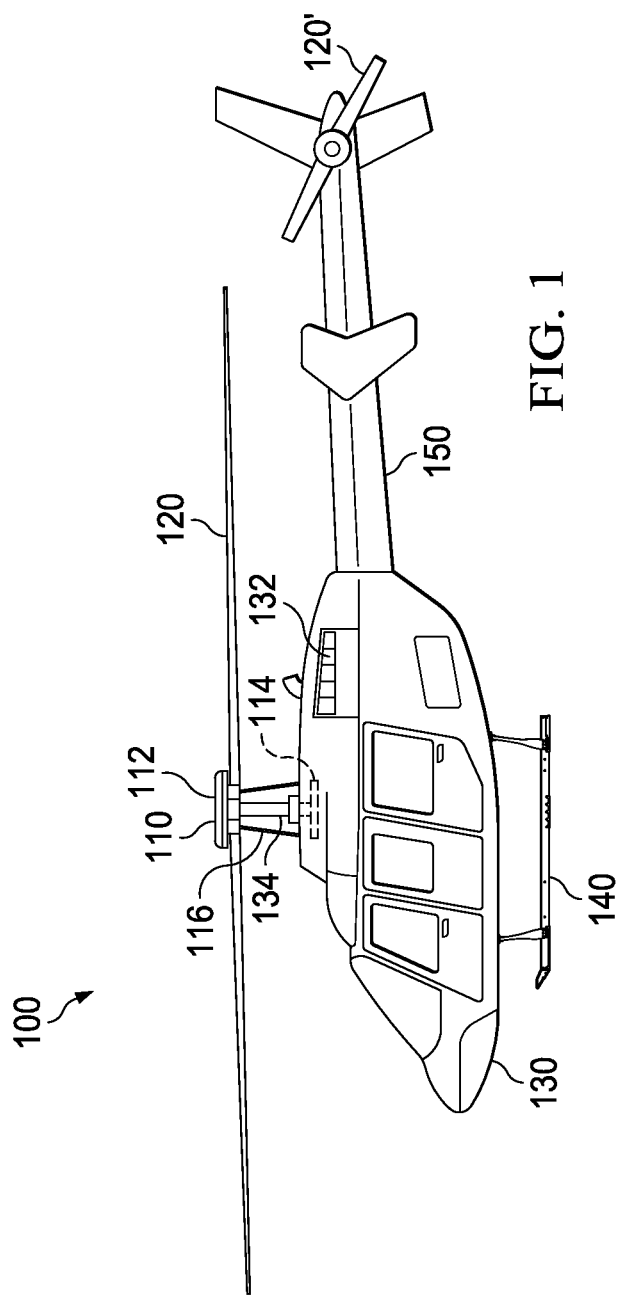
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Fuselage 130 may at least partially house a power train featuring a power source 132 and a drive shaft 134; the power train may be coupled to and configured to provide power to rotor system 110. Rotor system 110 may feature a hub 112 coupled to drive shaft 134, a swashplate 114 position about drive shaft 134, and a plurality of pitch links 116 coupled between swashplate 114 and hub 112. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

A pilot may manipulate one or more pilot flight controls in order to achieve controlled aerodynamic flight. Inputs provided by the pilot to the pilot flight controls may be transmitted mechanically and/or electronically (e.g., via a fly-by-wire flight control system) to flight control devices. Flight control devices may represent devices operable to change the flight characteristics of the aircraft. Examples of flight control devices on rotorcraft 100 may include the control system operable to change the positions of blades 120 and blades 120'.

FIG. 2 shows a cockpit configuration 160 of rotorcraft 100 according to one example embodiment. In the example of FIG. 2, rotorcraft 100 features at least three sets of pilot flight controls: cyclic control assemblies 200, collective control assemblies 300, and pedal assemblies 700. In the example of FIG. 2, a set of each pilot flight control is provided for a pilot and a co-pilot (both of which may be referred to as a pilot for the purposes of this discussion).

In general, cyclic pilot flight controls may allow a pilot to impart cyclic motions on blades 120. Cyclic motions in blades 120 may cause rotorcraft 100 to tilt in a direction specified by the pilot. For tilting forward and back (pitch) and/or tilting sideways (roll), the angle of attack of blades 120 may be altered cyclically during rotation, creating different amounts of lift at different points in the cycle.

Collective pilot flight controls may allow a pilot to impart collective motions on blades 120. Collective motions in blades 120 may change the overall lift produced by blades 120. For increasing or decreasing overall lift in blades 120, the angle of attack for all blades 120 may be collectively altered by equal amounts at the same time resulting in ascents, descents, acceleration, and deceleration.

Anti-torque pilot flight controls may allow a pilot to change the amount of anti-torque force applied to rotorcraft 100. As explained above, blades 120' may provide thrust in the same direction as the rotation of blades 120 so as to counter the torque effect created by rotor system 110 and blades 120. Anti-torque pilot flight controls may change the amount of anti-torque force applied so as to change the heading of rotorcraft 100. For example, providing anti-torque force greater than the torque effect created by rotor system 110 and blades 120 may cause rotorcraft 100 to rotate in a first direction, whereas providing anti-torque force less than the torque effect created by rotor system 110 and blades 120 may cause rotorcraft 100 to rotate in an opposite direction. In some embodiments, anti-torque pilot flight controls may change the amount of anti-torque force applied by changing the pitch of blades 120', increasing or reducing the thrust produced by blades 120' and causing the nose of rotorcraft 100 to yaw in the direction of the applied pedal. In some embodiments, rotorcraft 100 may include additional or different anti-torque devices (such as a rudder or a NOTAR anti-torque device), and the anti-torque pilot flight controls may change the amount of force provided by these additional or different anti-torque devices.

In the example of FIG. 2, each cyclic control assembly 200 is located to the right of a pilot seat, each collective control assembly 300 is located to the left of a pilot seat, and pedal assembly 700 is located in front of a pilot seat. Teachings of certain embodiments recognize that cyclic control assemblies 200, collective control assemblies 300, and pedal assemblies 700 may be located in any suitable position. Although cyclic pilot flight controls are typically located between the pilot's legs, teachings of certain embodiments recognize that embodiments of cyclic control assembly 200 may be located to the right of the pilot seat so as to improve pilot visibility and prevent inadvertent flight control inputs. For example, positioning cyclic control assembly 200 to the right of the pilot seat may provide the pilot with a clearer view out of the chin windows located near the pilot's feet. In addition, a pilot may be less likely to inadvertently move cyclic control assembly 200 if it is situated to the right of the pilot as compared to if it was situated between the pilot's legs.

As will be explained in greater detail below, embodiments of cyclic control assembly 200 and collective control assembly 300 may be used in a fly-by-wire flight control system. In some embodiments, a fly-by-wire flight control system may reduce the necessary range of movements for controls. Thus, teachings of certain embodiments recognize that assemblies 200 and 300 may operate with a reduced range of motion. In particular, teachings of certain embodiments recognize that reducing the range of motion of the cyclic control assembly may be one factor in allowing cyclic control assembly 200 to be moved from between the pilot's legs to the right side of the pilot.

Figure 3A:
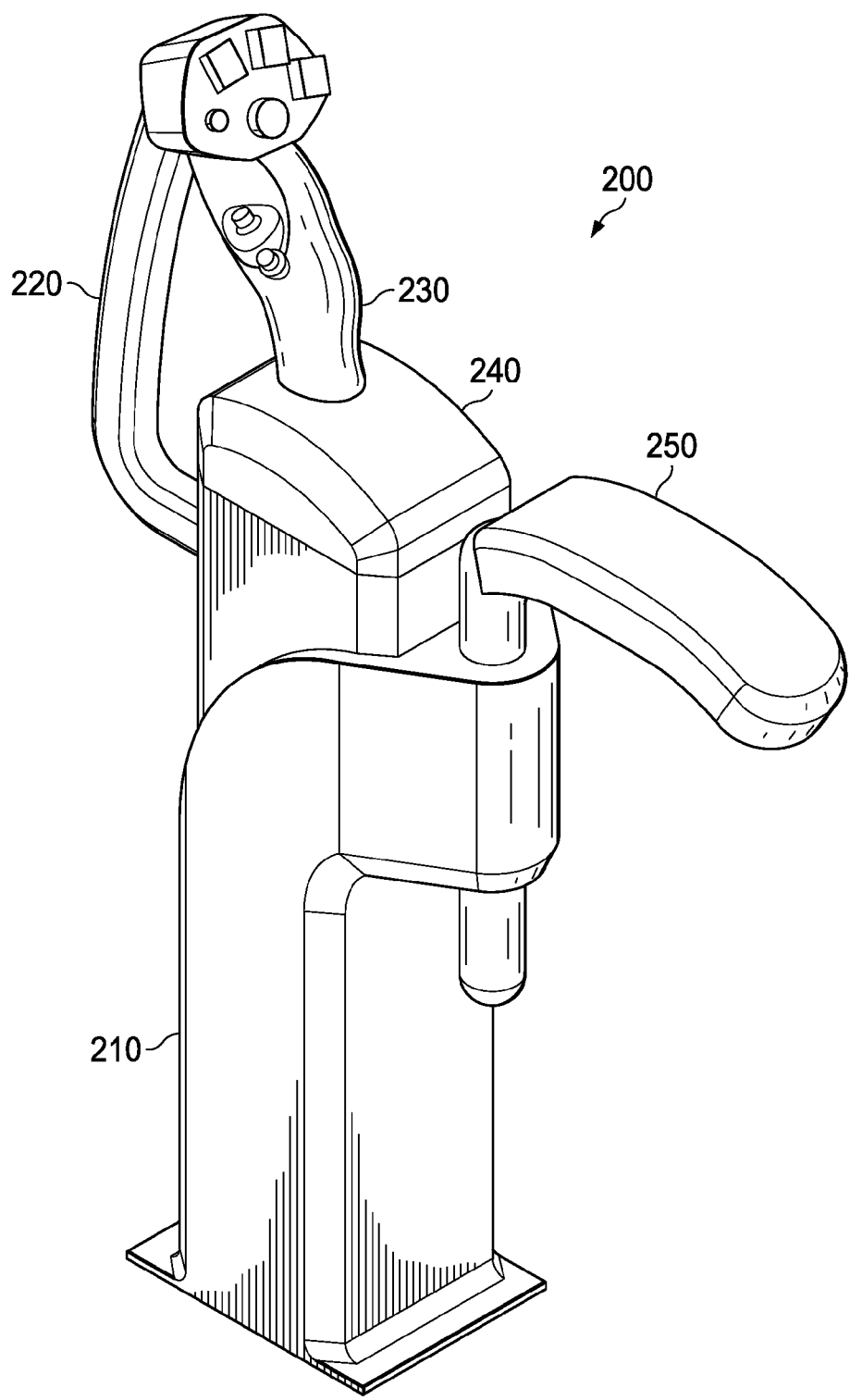
FIG. 3A shows a perspective view of a cyclic control assembly of the cockpit configuration of FIG. 2 according to one example embodiment.
Figure 3B:
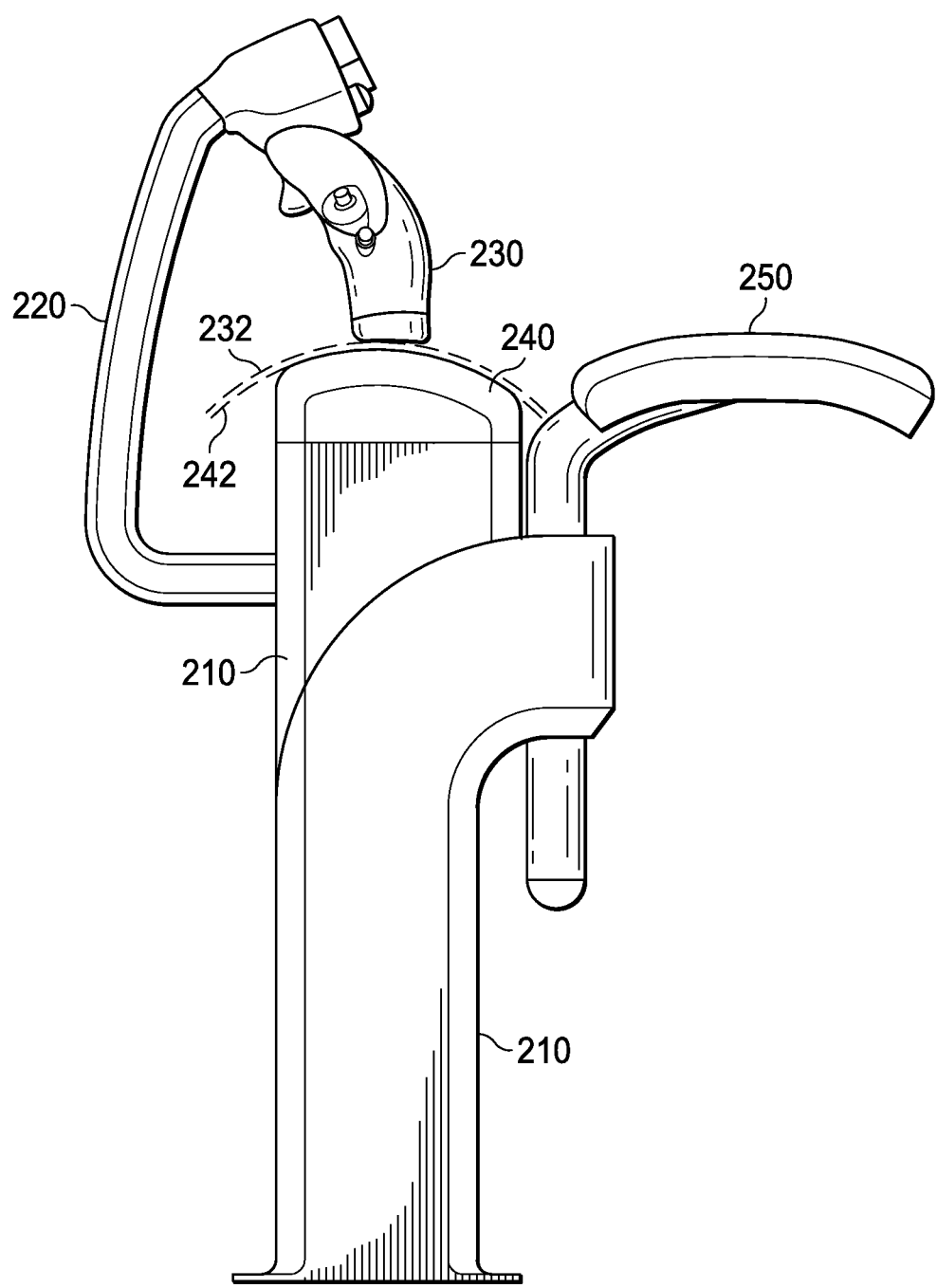
FIG. 3B shows a side view of the cyclic control assembly of FIG. 3A.
Figure 3C:
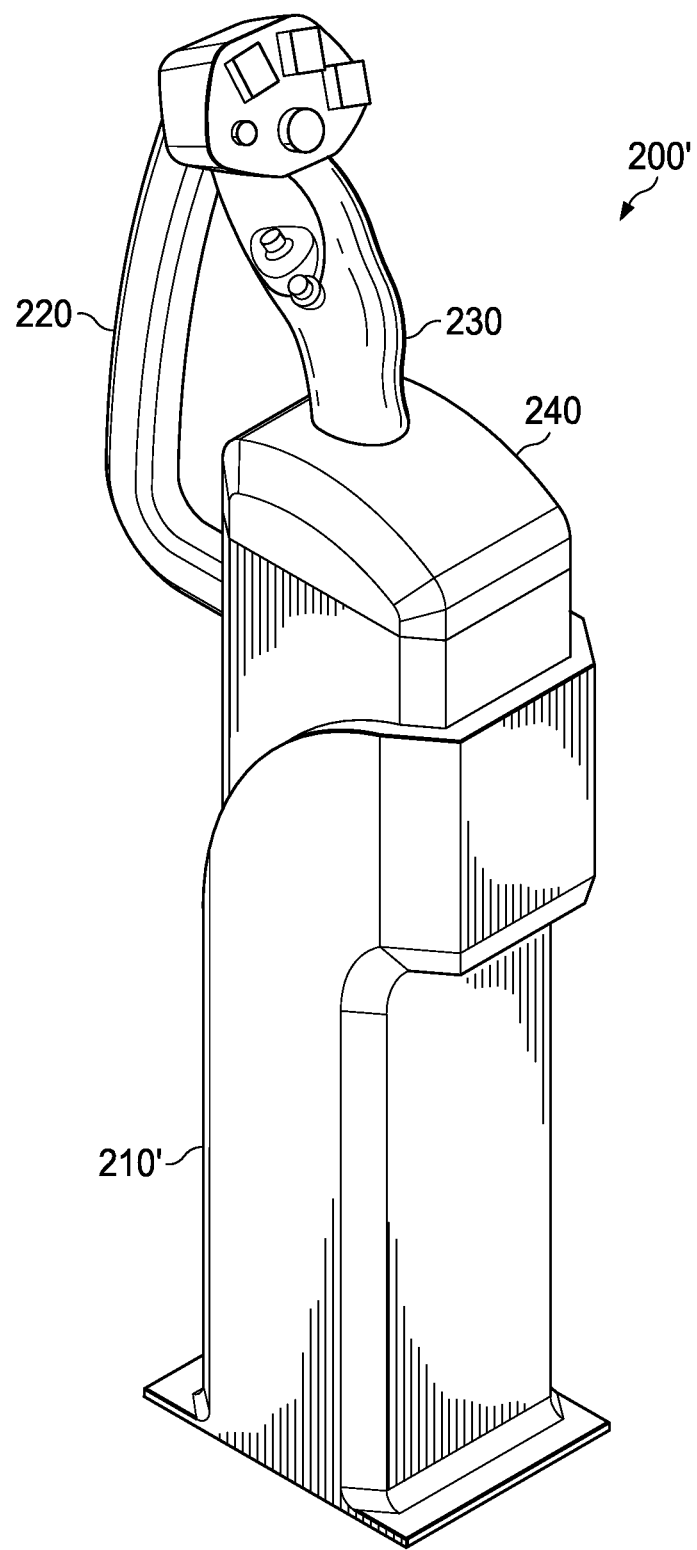
FIG. 3C shows an alternative embodiment of the cyclic control assembly of FIG. 3A.

FIGS. 3A-3B show cyclic control assembly 200 according to one example embodiment. FIG. 3A shows a perspective view of cyclic control assembly 200, and FIG. 3B shows a side view. FIG. 3C shows an alternative of cyclic control assembly 200 with the arm rest removed.

As seen in FIG. 3A, cyclic control assembly 200 may feature a post 210, a shaft 220, a grip 230, a hand rest 240, and an arm rest 250. In the example of FIG. 3A, shaft 220 has a first end coupled proximate to the body of post 210 below hand rest 240 and a second end opposite the first end coupled to grip 230. In particular, the first end of shaft 220 is coupled to at least one linkage disposed at least partially within post 210 through an opening in the body of post 210. In this manner, grip 230 is movable such that moving grip 230 mechanically communicates cyclic commands from the pilot to the at least one linkage disposed at least in part within the body of part 210.

In the example of FIG. 3A, shaft 220 is curved such that shaft 220 positions at least part of grip 230 over hand rest 240. In this manner, grip 230 may be described as "floating" above hand rest 240.

Teachings of certain embodiments recognize that floating grip 230 over hand rest 240 may avoid having the cyclic stick and control tube penetrate through the top of post 210, thus eliminating the need for any macroscopic openings in the top of post 210. Eliminating the need for an opening in the top of post 210, in turn, prevents dirt and debris from falling into the opening and prevents objects from being lodged in the opening, which could limit the range of motion of grip 230.

In addition, elimination of the opening may allow the pilot to have a comfortable hand rest 240 and may allow the pilot to make precise control inputs to grip 230. For example, hand rest 240 may provide a stable, non-moving platform relative to grip 230. In this example, the pilot may stabilize a hand against hand rest 240 while making control inputs through the full range of travel of grip 230. In addition, hand rest 240 may help reduce pilot induced oscillations. For example, hand rest 240 may provide a means for the pilot to vary friction and damping of the controls by adjusting the pilot's hand position/pressure on hand rest 240 while keeping hands on grip 230. In addition, the pilot can adjust hand pressure on hand rest 240 to mitigate against a failure of the control system's friction and/or damping devices.

A floating grip 230 results in a gap existing between grip 230 and hand rest 240. In some embodiments, the gap may be large enough to allow grip 230 to travel without touching hand rest 240 yet small enough to prevent a human hand or other objects from wedging between grip 230 and hand rest 240. In other embodiments, the gap may be large enough to allow a human hand between grip 230 and hand rest 240. In some embodiments, grip 230 may have a range of motion for cyclic movements of about five inches.

In some embodiments, hand rest 240 may have an upper surface having a profile 242 corresponding to the travel arc 232 of grip 230. For example, grip 230 may travel along a first arc in a longitudinal direction (e.g., to tilt rotorcraft 100 forward and back) and along a second arc in a lateral direction (e.g., to tilt rotorcraft 100 from side to side). In this example, hand rest 240 may have an upper surface having a profile corresponding to the first and second travel arcs. As one example, the profile may correspond to the first and second travel arcs by maintaining a substantially constant gap between grip 230 and hand rest 240 as the grip moves along a travel arc. As another example, the upper surface of hand rest 240 may have a curvature that substantially matches the travel arc of grip 230. In some embodiments, the upper surface of hand rest 240 may correspond to the travel arc of floating grip 230 without necessarily maintaining a constant gap or having a substantially matching travel arc. For example, in some embodiments, the profile of hand rest 340 may correspond to the expect travel arc of the pilot's hand as the pilot moves grip 330. As another example, in some embodiments, the profile of hand rest 240 may correspond to the travel arc of grip 230 such that grip 230 does not contact hand rest 240 at any point in its travel arc, even if the gap between grip 230 and hand rest 240 changes at some point in the travel arc. As another example, the gap between grip 230 and hand rest 240 may be relatively constant over a certain range (such as in the center of hand rest 240) but the gap may grow if grip 230 is moved over a wider range (such as towards the edges of hand rest 240).

In some embodiments, shaft 220 and grip 230 may be manufactured independently and assembled together. In other embodiments, shaft 220 and grip 230 may be manufactured jointly, such as formed in a single casting.

In the examples of FIGS. 3A and 3B, cyclic control assembly 200 also features an arm rest 250. In these examples, arm rest 250 is coupled directly to post 210 (as compared to being coupled to the floor, to the seat, or to the cockpit wall). In some embodiments, arm rest 250 is adjustable. In the example of FIGS. 3A and 3B, arm rest 250 is adjustable about three axes of rotation. For example, arm rest 250 may swivel relative to post 210, may slide up and down substantially parallel to post 210, and may pivot about an axis substantially perpendicular to post 210 so as to change the angle between hand rest 240 and arm rest 250. In some embodiments, the pilot may adjust arm rest 250 about all three axes using one hand. For example, an adjust button may be provided to allow the pilot to press the adjust button and move arm rest 250 using a single hand.

In some embodiments, hand rest 240 and arm rest 250 may have corresponding profiles. As one example, hand rest 240 and arm rest 250 may have upper surfaces that may be aligned along a common arc. In some embodiments, arm rest 250 may need to be adjusted so as to align the upper surfaces of hand rest 240 and arm rest 250 along the common arc.

As stated above, shaft 220 may be coupled to at least one linkage disposed at least partially within post 210 through an opening in the body of post 210. In this manner, grip 230 may be movable such that moving grip 230 mechanically communicates cyclic commands from the pilot to the at least one linkage disposed at least in part within the body of part 210.

Figure 4A:
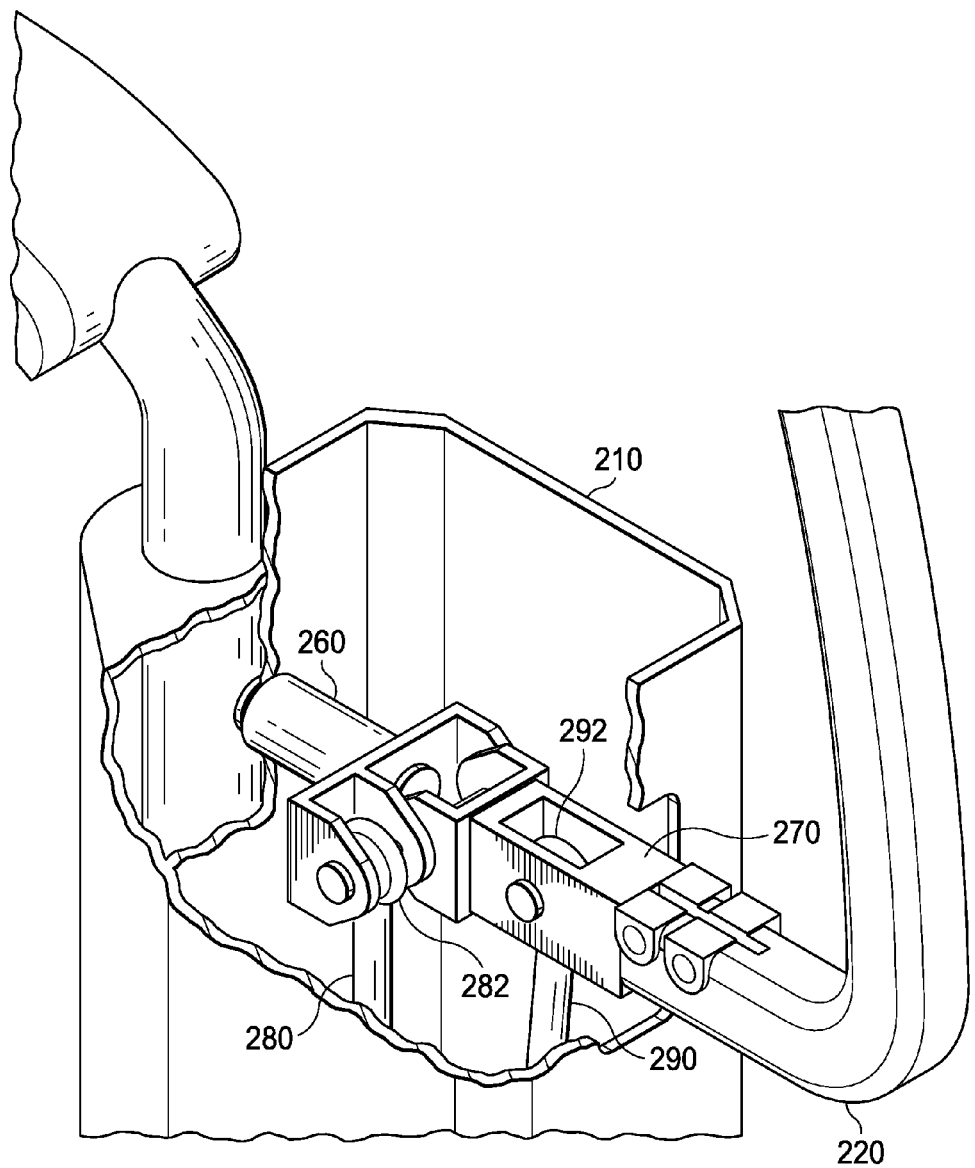
FIGS. 4A-4C show a compact gimbal mechanism for use in the cyclic control assembly of FIG. 3A according to one example embodiment.
Figure 4B:
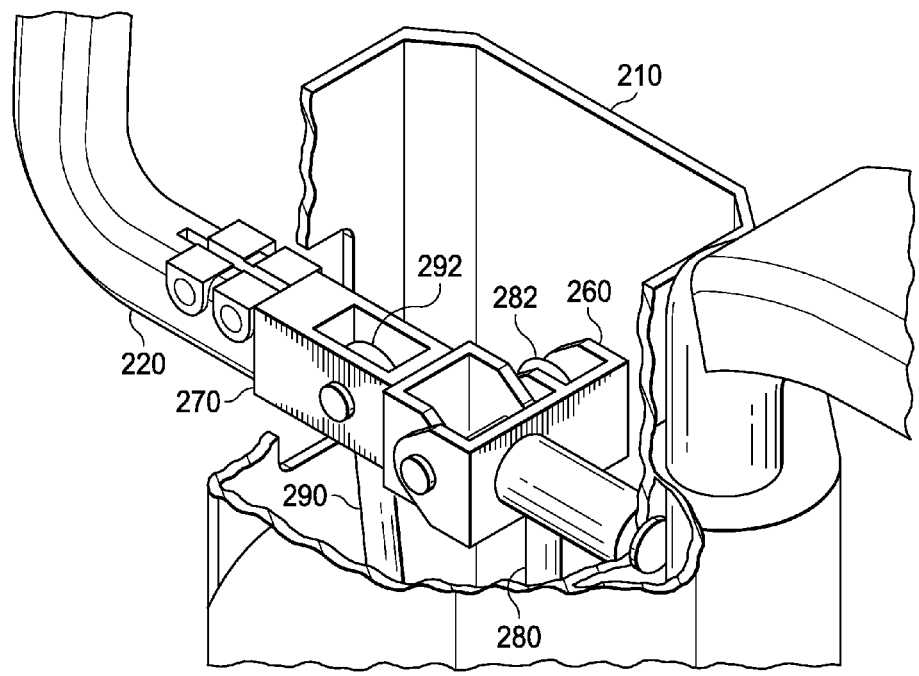
Figure 4C:
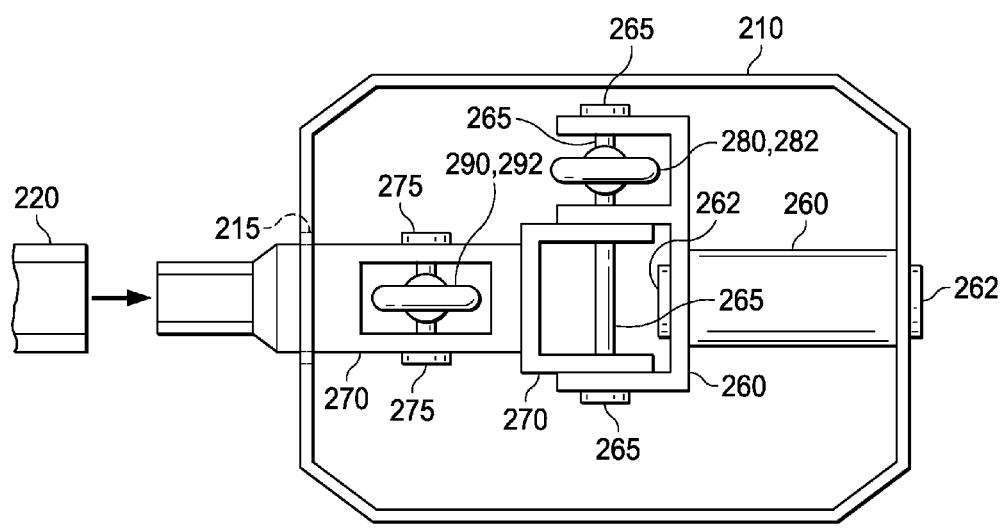

FIGS. 4A-4C show a compact gimbal mechanism according to one example embodiment. Teachings of certain embodiments recognize that the compact gimbal mechanism may allow for mechanical communications of cyclic commands from shaft 220. In particular, teachings of certain embodiments recognize the ability to communicate cyclic commands in two directions (e.g., forward/backwards and left/right).

In the example of FIGS. 4A-4C, the compact gimbal mechanism features a gimbal 260, a gimbal 270, and linkages 280 and 290. Gimbal 260 is coupled to the inside of the body of post 210 via an attachment mechanism 262 and is rotatable about a first axis of rotation. Gimbal 260 features a linkage attachment point offset from the first axis of rotation. Linkage 280 is coupled to gimbal 260 and this linkage attachment point. In the example of FIG. 4C, a pin 265 travels through the linkage attachment point, and linkage 280 features a bearing end 282 that receives pin 265.

Gimbal 270 is coupled to gimbal 260 and is rotatable relative to gimbal 260 about a second axis of rotation. In the example of FIG. 4C, pin 265 is coaxial with the second axis of rotation and couples gimbal 270 to gimbal 260 when grip 230 is in a neutral position. Gimbal 270 features a linkage attachment point offset from the second axis of rotation. Linkage 290 is coupled to gimbal 270 at this linkage attachment point. In the example of FIG. 4C, a pin 275 travels through the linkage attachment point, and linkage 290 features a bearing end 292 that receives pin 275.

Shaft 220 is coupled to gimbal 270. In the example of FIGS. 4A-4C, shaft 220 is coupled to gimbal 270 proximate to an opening 215 in post 210. In this example, at least part of shaft 220 is coaxial with the first axis of rotation of gimbal 260 when grip 230 is in a neutral position. In addition, shaft 220 is rotatable about both the first axis of rotation of gimbal 260 and the second axis of rotation of gimbal 270.

For example, in operation according to one embodiment, left/right cyclic tilting commands are communicated from grip 230 through linkage 280. A pilot may move grip 230 left (or right) to communicate a left (or right) cyclic command. Moving grip 230 to the left causes shaft 220 also to move to the left. As explained above, shaft 220 is coupled to gimbal 270, which is coupled to gimbal 260. Accordingly, when shaft 220 moves left, gimbals 260 and 270 both rotate about the axis of rotation of gimbal 260 (which in this example is coaxial with part of shaft 220 when grip 230 is in a neutral position). Rotation of gimbals 260 and 270 causes linkage 280 to move up (or down), thus allowing linkage 280 to communicate left/right cyclic commands from grip 230. In this example, linkage 290 has little movement because the linkage attachment point of linkage 290 is coaxial with the axis of rotation of gimbal 260 when grip 230 is in a neutral position.

Additionally, forward/back cyclic tilting commands may be communicated from grip 230 through linkage 290. A pilot may move grip 230 forward (or back) to communicate a forward (or back) cyclic command. Moving grip 230 forward causes shaft 220 to rotate forward. As explained above, shaft 220 is coupled to gimbal 270, which is rotatably coupled to gimbal 260. In this example, when shaft 220 rotates forward, gimbal 270 rotates about its axis of rotation relative to gimbal 260. Rotation of gimbal 270 relative to gimbal 260 causes linkage 290 to move up (or down), thus allowing linkage 290 to communicate forward/back cyclic commands from grip 230. In this example, linkage 280 has little movement because the linkage attachment point of linkage 280 is coaxial with the axis of rotation of gimbal 270 when grip 230 is in a neutral position.

Accordingly, teachings of certain embodiments recognize that the gimbal mechanism of FIGS. 4A-4C may receive and decouple left/right cyclic commands and front/back cyclic commands. Teachings of certain embodiments recognize that the gimbal mechanism of FIGS. 4A-4C may decouple left/ right cyclic commands from front/back cyclic commands within the confined space of post 210.

Figure 5A:
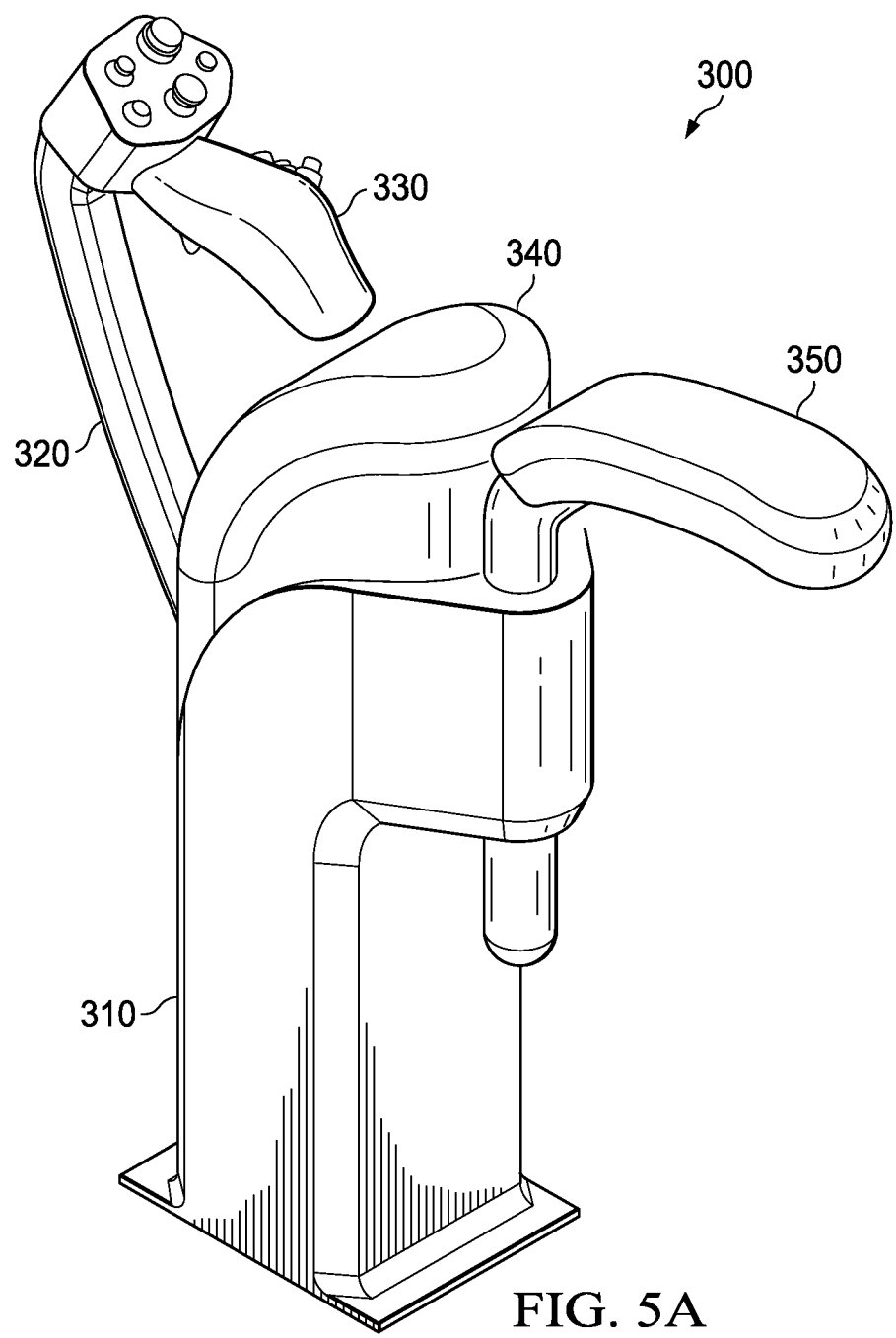
FIG. 5A shows a perspective view of a collective control assembly of the cockpit configuration of FIG. 2 according to one example embodiment.
Figure 5B:
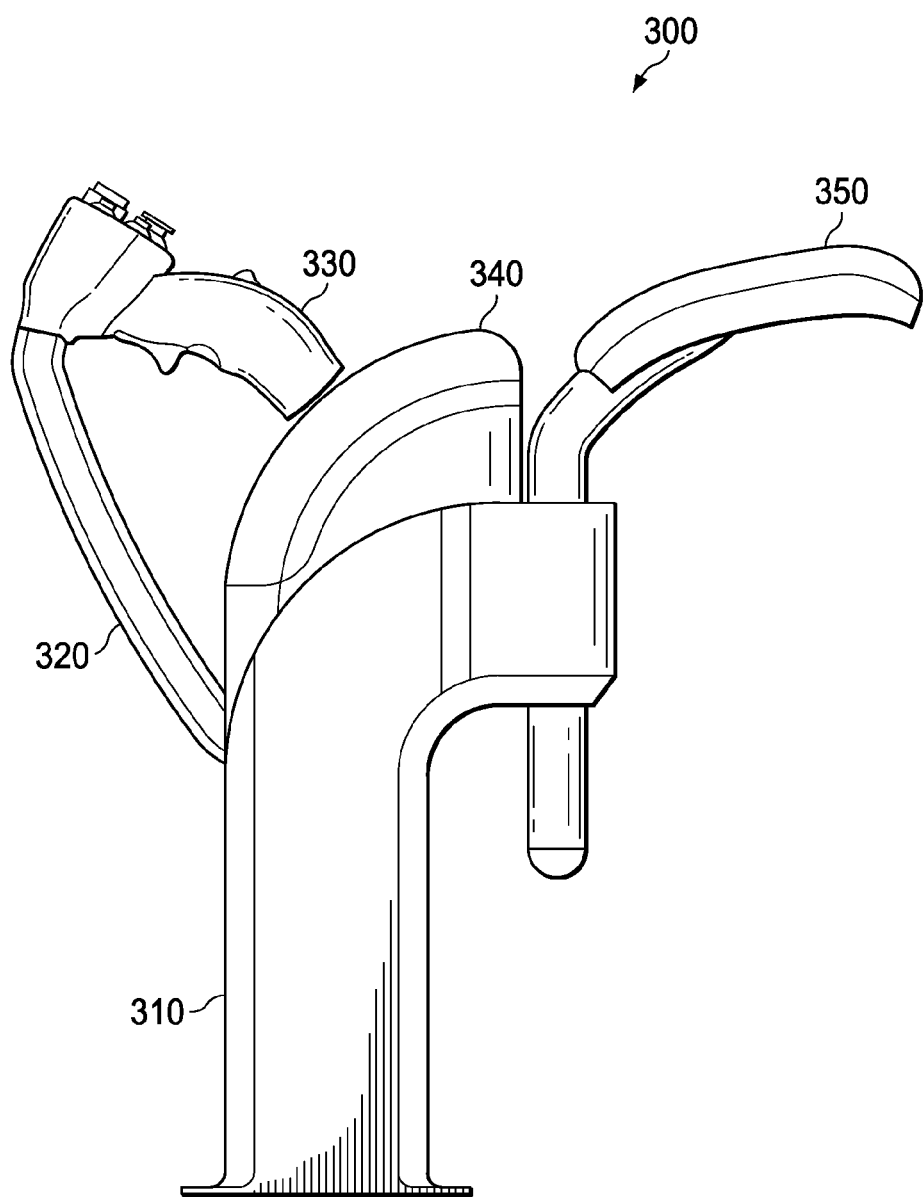
FIG. 5B shows a side view of the collective control assembly of FIG. 5A.
Figure 5C:
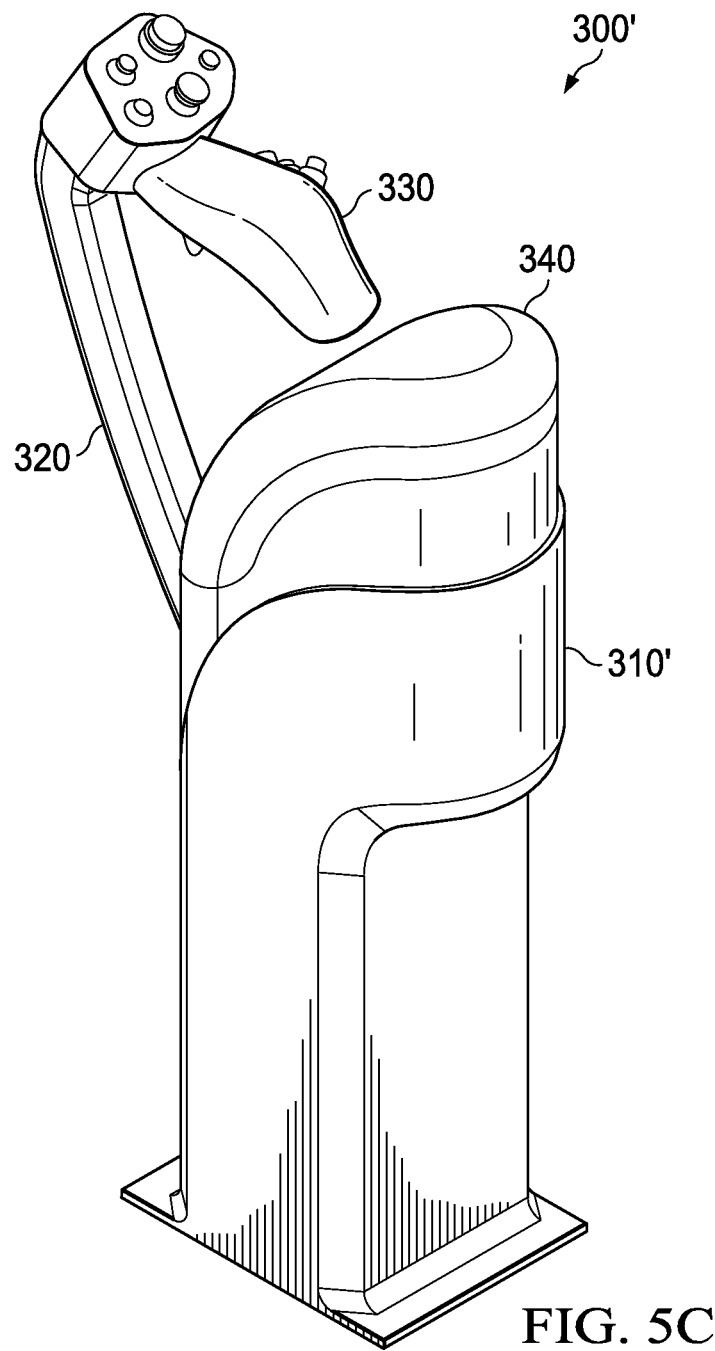
FIG. 5C shows an alternative embodiment of the collective control assembly of FIG. 5A.

FIGS. 5A-5B show collective control assembly 300 according to one example embodiment. FIG. 5A shows a perspective view of collective control assembly 300, and FIG. 5B shows a side view. FIG. 5C shows an alternative of collective control assembly 300 with the arm rest removed.

In some embodiments, collective control assembly 300 may resemble cyclic control assembly 200. Unlike cyclic control assembly 200, however, teachings of certain embodiments recognize a different range of motion for collective control assembly 300. In particular, most collective controls allow the pilot to pull a grip up and down. Teachings of certain embodiments recognize collective control assembly 300 may also allow the pilot to pull a grip up and down. Teachings of certain embodiments recognize, however, the ability to still provide a hand rest under the grip even though the grip may be pulled up and down by the pilot.

As seen in FIG. 5A, collective control assembly 300 may feature a post 310, a shaft 320, a grip 330, a hand rest 340, and an arm rest 350. In the example of FIG. 3A, shaft 320 has a first end coupled proximate to the body of post 310 below hand rest 340 and a second end opposite the first end coupled to grip 330. In particular, the first end of shaft 320 is coupled to at least one linkage disposed at least partially within post 310 through an opening in the body of post 310. In this manner, grip 330 is movable such that moving grip 330 mechanically communicates collective commands from the pilot to the at least one linkage disposed at least in part within the body of part 310.

In the example of FIG. 5A, shaft 320 is curved such that shaft 320 positions at least part of grip 330 over hand rest 340. In this manner, grip 330 may be described as "floating" above hand rest 340.

Teachings of certain embodiments recognize that floating grip 330 over hand rest 340 may avoid having the collective stick and control tube penetrate through the top of post 310, thus eliminating the need for any macroscopic openings in the top of post 310. Eliminating the need for an opening in the top of post 310, in turn, prevents dirt and debris from falling into the opening and prevents objects from being lodged in the opening, which could limit the range of motion of grip 330.

In addition, elimination of the opening may allow the pilot to have a comfortable hand rest 340 and may allow the pilot to make precise control inputs to grip 330. For example, hand rest 340 may provide a stable, non-moving platform relative to grip 330. In this example, the pilot may stabilize a hand against hand rest 340 while making control inputs through the full range of travel of grip 330. In addition, hand rest 340 may help reduce pilot induced oscillations. For example, hand rest 340 may provide a means for the pilot to vary friction and damping of the controls by adjusting the pilot's hand position/pressure on hand rest 340 while keeping hands on grip 330. In addition, the pilot can adjust hand pressure on hand rest 340 to mitigate against a failure of the control system's friction and/or damping devices.

A floating grip 330 results in a gap existing between grip 330 and hand rest 340. In some embodiments, the gap may be large enough to allow grip 330 to travel without touching hand rest 340 yet small enough to prevent a human hand or other objects from wedging between grip 330 and hand rest 340. In some embodiments, grip 330 may have a range of motion for collective movements of about five inches.

In some embodiments, hand rest 340 may have an upper surface having a profile corresponding to the travel arc of grip 330. For example, grip 330 may travel along a single arc for increasing or decreasing lift generated by blades 120. In this example, hand rest 340 may have an upper surface having a profile corresponding to this travel arc. As one example, the profile may correspond to the travel arc by maintaining a substantially constant gap between grip 330 and hand rest 340 as the grip moves along the travel arc. As another example, the upper surface of hand rest 340 may have a curvature that substantially matches the travel arc of grip 330. In some embodiments, the upper surface of hand rest 340 may correspond to the travel arc of floating grip 330 without necessarily maintaining a constant gap or having a substantially matching travel arc. For example, in some embodiments, the profile of hand rest 340 may correspond to the expect travel arc of the pilot's hand as the pilot moves grip 330. As another example, the profile of hand rest 340 may correspond to the travel arc of grip 330 such that grip 330 does not contact hand rest 340 at any point in its travel arc, even if the gap between grip 330 and hand rest 340 changes at some point in the travel arc. As another example, the gap between grip 330 and hand rest 340 may be relatively constant over a certain range (such as in the center of hand rest 340) but the gap may grow if grip 330 is moved over a wider range (such as towards the edges of hand rest 340).

In some embodiments, shaft 320 and grip 330 may be manufactured independently and assembled together. In other embodiments, shaft 320 and grip 330 may be manufactured jointly, such as formed in a single casting.

In the examples of FIGS. 5A and 5B, collective control assembly 300 also features an arm rest 350. In these examples, arm rest 350 is coupled directly to post 310 (as compared to being coupled to the floor, to the seat, or to the cockpit wall). In some embodiments, arm rest 350 is adjustable. In the example of FIGS. 3A and 3B, arm rest 350 is adjustable about three axes of rotation. For example, arm rest 350 may swivel relative to post 310, may slide up and down substantially parallel to post 310, and may pivot about an axis substantially perpendicular to post 310 so as to change the angle between hand rest 340 and arm rest 350. In some embodiments, the pilot may adjust arm rest 350 about all three axes using one hand. For example, an adjust button may be provided to allow the pilot to press the adjust button and move arm rest 350 using a single hand.

In some embodiments, hand rest 340 and arm rest 350 may have corresponding profiles. As one example, hand rest 340 and arm rest 350 may have upper surfaces that may be aligned along a common arc. In some embodiments, arm rest 350 may need to be adjusted so as to align the upper surfaces of hand rest 340 and arm rest 350 along the common arc.

Figure 6A:
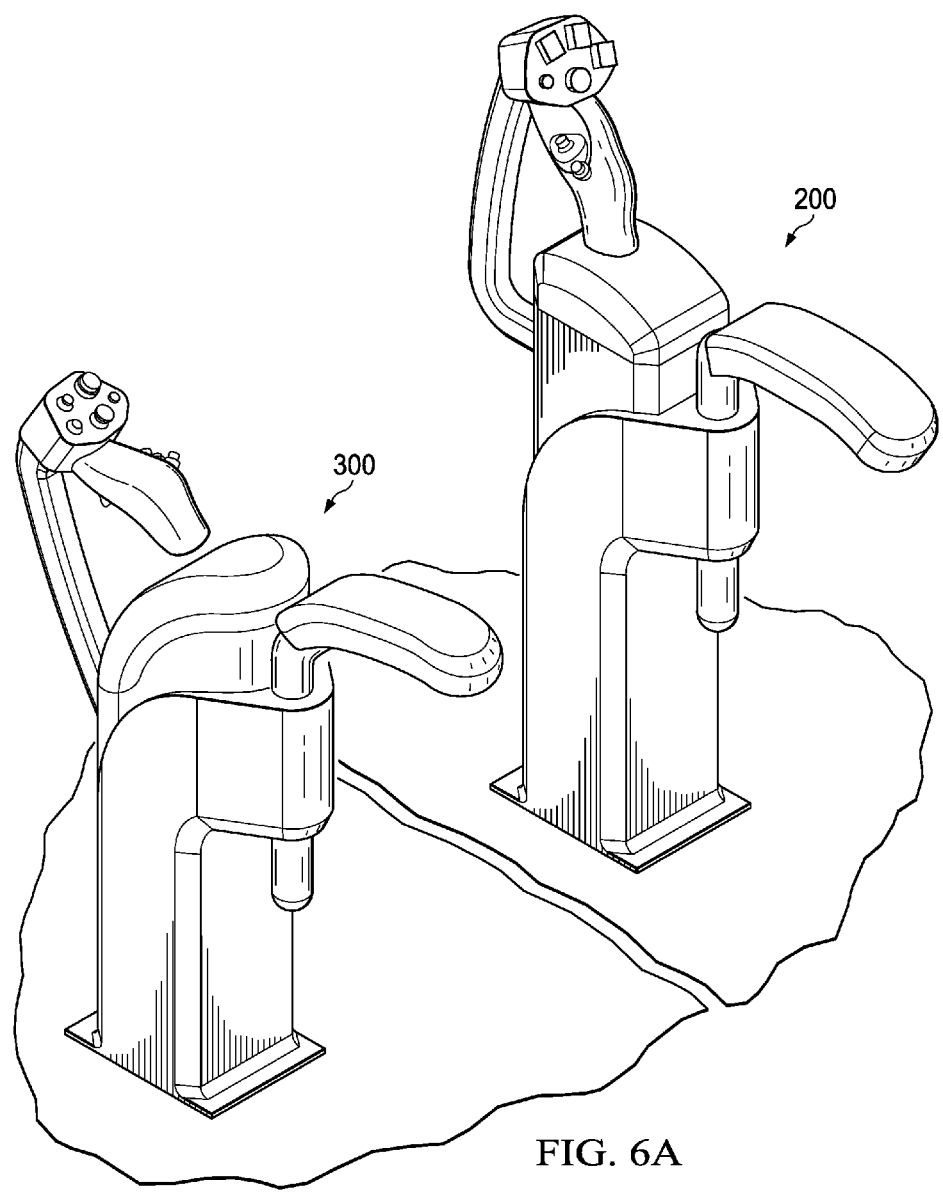
FIGS. 6A-6C show relative positions and shapes of the cyclic control assembly of FIG. 3A and the collective control assembly of FIG. 5A according to one example embodiment.
Figure 6B:
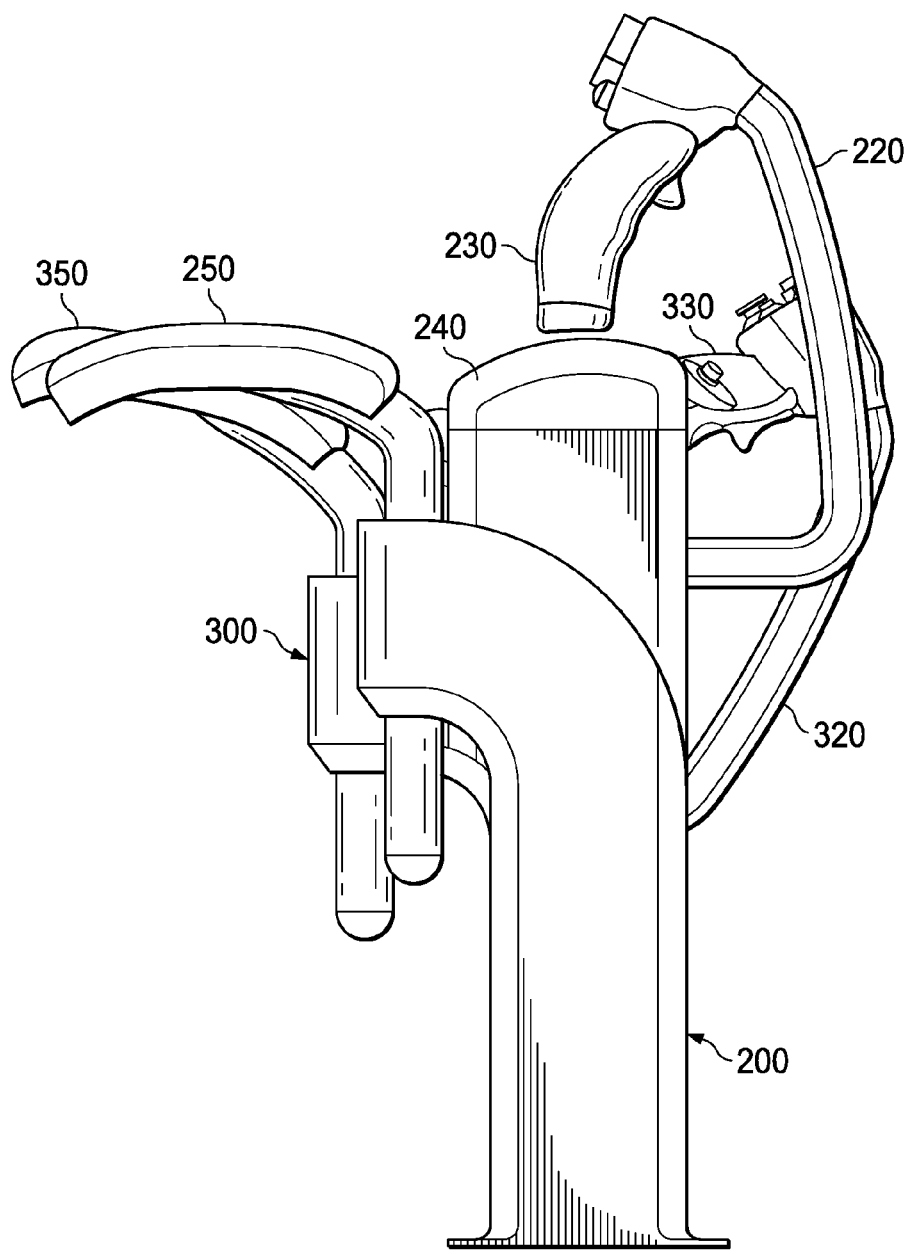
Figure 6C:
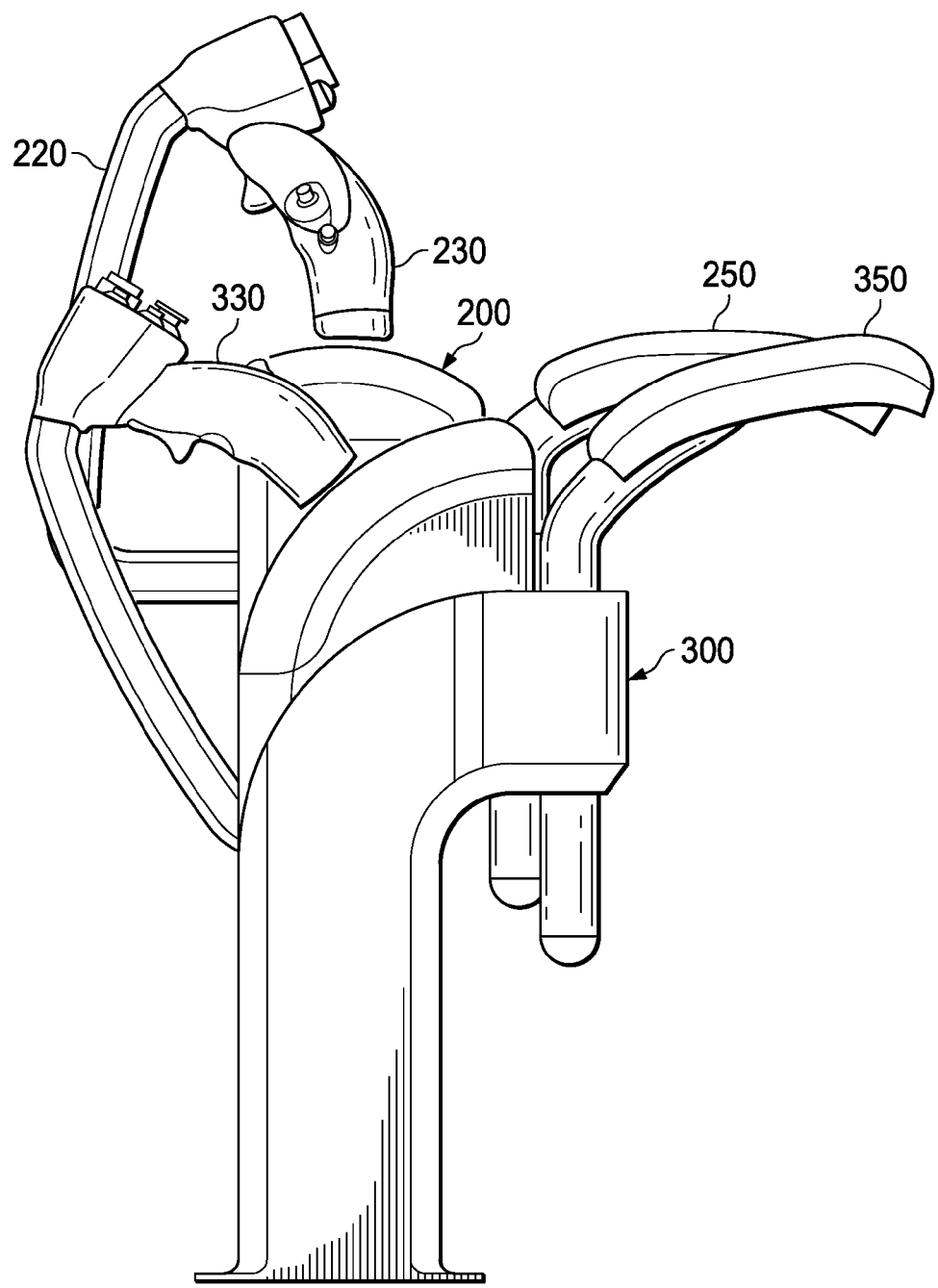

FIGS. 6A-6C show relative positions and shapes of cyclic control assembly 200 and collective control assembly 300. FIG. 6A shows a perspective view of cyclic control assembly 200 and collective control assembly 300, FIG. 6B shows a right side view of cyclic control assembly 200 and collective control assembly 300, and FIG. 6C shows a left side view of cyclic control assembly 200 and collective control assembly 300.

As can be seen in FIGS. 6A-6C, collective control assembly 300 has a more vertical handrest than cyclic control assembly 200. Teachings of certain embodiments recognize that collective control assembly 300 may have a more vertical handrest to simulate the traditional experience of pulling up on a collective control handle. Teachings of certain embodiments recognize that the more vertical handrest may allow the grip to be moved up and down while still providing a handrest underneath the arc of motion of the grip.

In addition, cyclic control assembly 200 and collective control assembly 300 have different shafts. In particular, the shaft cyclic control assembly 200 features a bent portion that is missing from the shaft of collective control assembly 300. Teachings of certain embodiments recognize that the bent portion may serve several purposes. For example, the bent portion may allow shaft 220 to position grip 230 over hand rest 240. In addition, the bent portion may allow shaft 220 to be coaxial with the gimbals inside post 210 at the point where shaft 220 attaches to the gimbals. As explained above, positioning the shaft 220 coaxial with the gimbals may allow the gimbals to receive and decouple left/right tilting motions and forward/back tilting motions. Collective control assembly 300, on the other hand, may only receive collective control movements, and therefore it may not be necessary for collective control assembly 300 to decouple motions in multiple directions.

Figure 7:
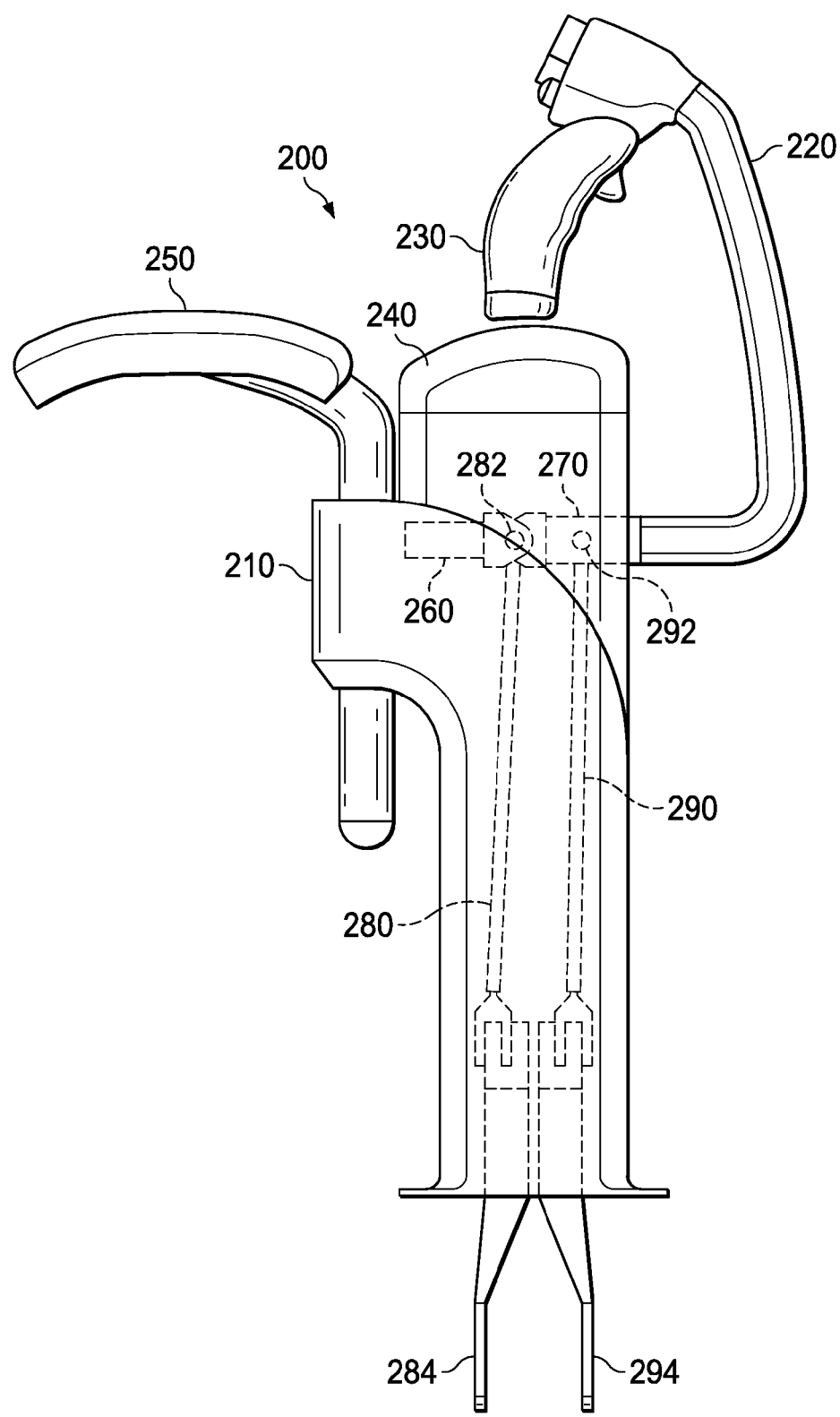
FIG. 7 shows the cyclic control assembly of FIG. 3A with the gimbals of FIGS. 4A-4C.

FIG. 7 shows cyclic control assembly 200 with its gimbals 260 and 270. Teachings of certain embodiments recognize that cyclic control assembly 200, along with the gimbal mechanism inside post 210, may be assembled prior to installation in an aircraft. For example, cyclic control assembly 200 may be preassembled with bell cranks 284 and 294, which are coupled to linkages 280 and 290, respectively. Once cyclic control assembly 200 is situated in the aircraft, bell cranks 284 and 294 may be coupled to equipment in the aircraft configured to receive cyclic control motions from cyclic control assembly 200.

Teachings of certain embodiments recognize that preassembling cyclic control assembly 200 (or collective control assembly 300) may reduce the time and resources necessary to install pilot control systems in an aircraft. For example, cyclic control assembly 200 may be rigged and tuned during the assembly process rather than in the aircraft, where space is more confined. In addition, preassembly of cyclic control assembly 200 allows cyclic control assembly 200 to be installed in a relatively-simple three step process: couple bell crank 284 to a linkage for left/right cyclic movements; couple bell crank 294 to a linkage for front/back cyclic movements; and secure post 210 to the cockpit floor.

Figure 8:
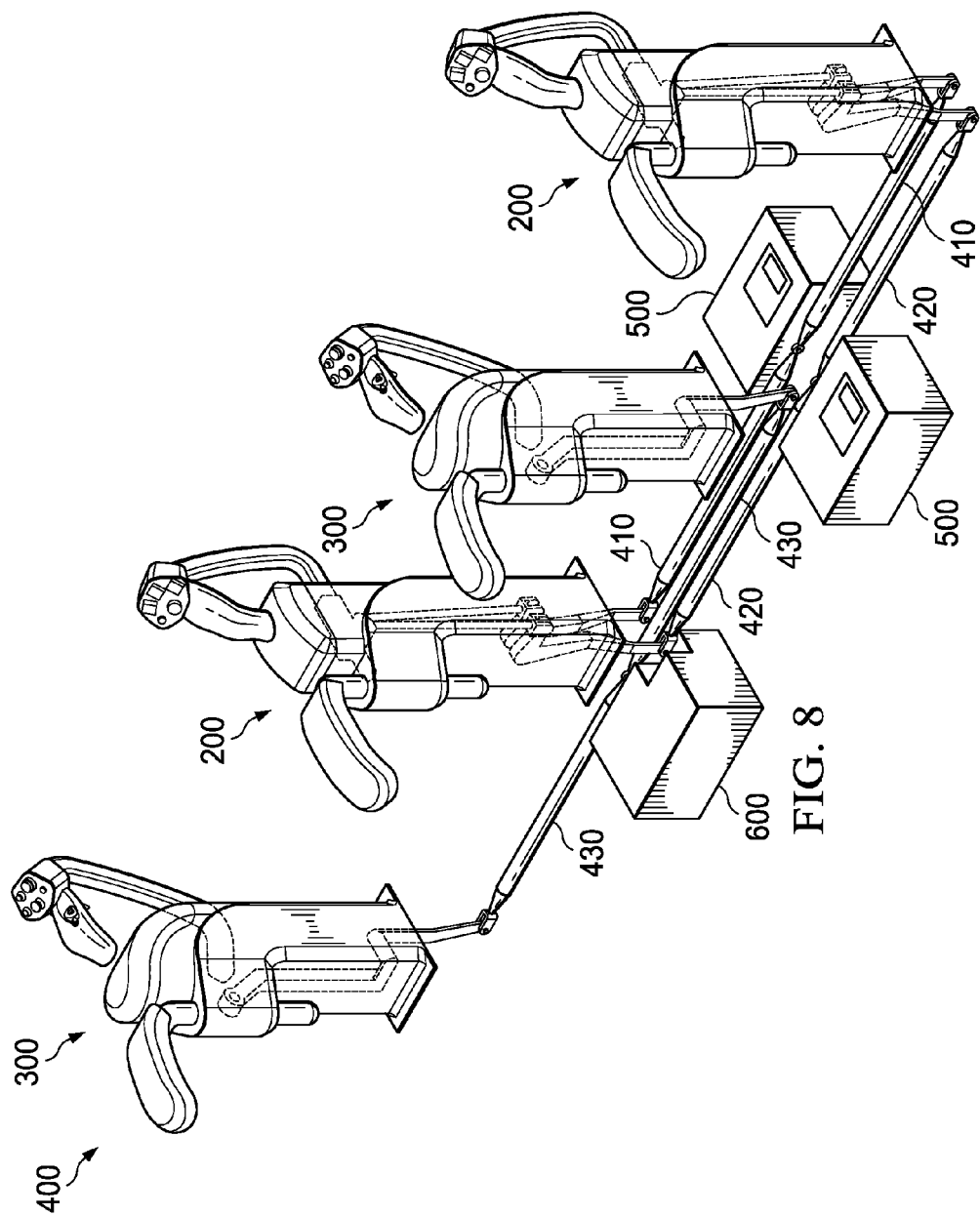
FIG. 8 shows an installation 400 of two cyclic control assemblies of FIG. 3A and two collective control assemblies of FIG. 5A according to one example embodiment.

FIG. 8 shows an installation 400 of two cyclic control assemblies 200 and two collective control assemblies 300 according to one example embodiment. In this example, the two cyclic control assemblies 200 and two collective control assemblies 300 are coupled to three integrated trim assemblies: two cyclic trim assemblies 500 and a collective trim assembly 600. One of the cyclic trim assemblies 500 manages left/right cyclic tilting movements, and the other cyclic trim assembly 500 manages front/back tilting movements.

In the installation 400 of FIG. 8, linkages 410 couple the bell cranks 294 of both cyclic control assemblies 200 to a cyclic trim assembly 500, and linkages 420 couple the bell cranks 284 of both cyclic control assemblies 200 to the other cyclic trim assembly 500. Linkages 430 couple the bell cranks of both collective control assemblies 300 to the collective trim assembly 600. In this example, linkages 410-430 and trim assemblies 500 and 600 are located under the cockpit floor.

In the example of FIG. 8, cyclic trim assemblies 500 and collective trim assembly 600 are operable to receive and measure mechanical communications of cyclic and collective motions from the pilot. In this example, cyclic trim assemblies 500 and collective trim assemblies 600 may represents components in a fly-by-wire flight control system, and the measurements from cyclic trim assemblies 500 and collective trim assemblies 600 may be sent to a flight control computer operable to instruct rotor system 100 to change a position of blades 120 based on the received measurements. For example, the flight control computer may be in communication with actuators or other devices operable to change the position of blades 120.

Figure 9:
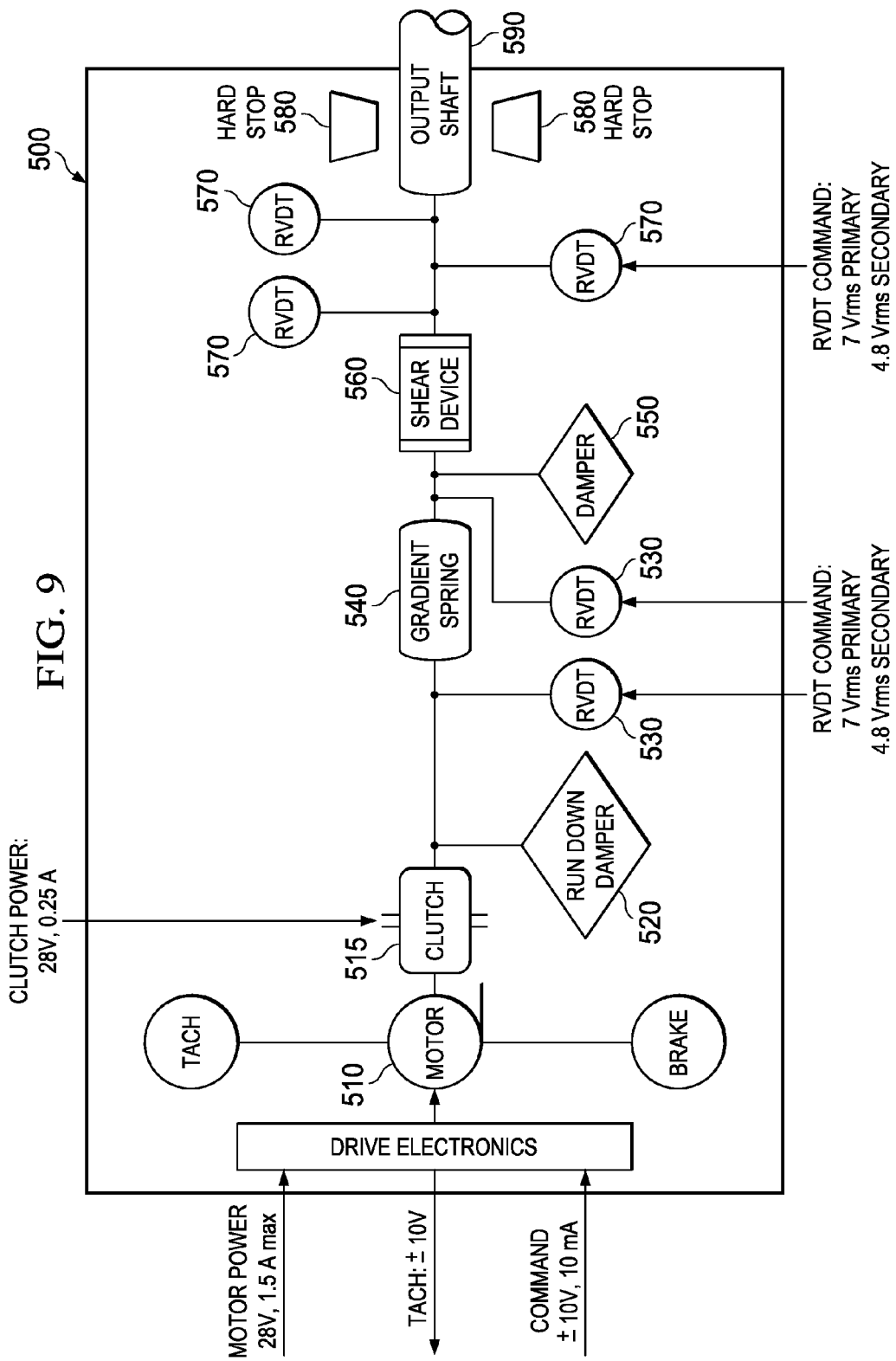
FIG. 9 shows a diagram representation of the cyclic trim assemblies of FIG. 8 according to one example embodiment.

FIG. 9 shows a diagram representation of the cyclic trim assemblies 500 of FIG. 8 according to one example embodiment. In this example, each cyclic trim assembly 500 features a trim motor 510, a clutch 515, a run-down damper 520, position measurement devices 530, a gradient spring 540, a damper 550, a shear device 560, position measurement devices 570, mechanical stop devices 580, and an output shaft 590. In the example of FIG. 8, shaft 590 may be coupled to linkages 410 or 420. Although shaft 590 may be described as a single shaft, teachings of certain embodiments recognize that shaft 590 may represent multiple pieces. As one example, shaft 590 may include two shafts separated by gradient spring 540. In another example, shaft 590 may represent a single shaft with a torsion spring attached.

In operation, according to one example embodiment, output shaft 590 and cyclic control assemblies 200 are in mechanical communication such that movement of grip 230 results in movement of output shaft 590 and movement of output shaft 590 likewise results in movement of grip 230. Movement of output shaft 590 may be measured by position measurement devices 530 and 570. The measurements from measurement devices 530 and 570 may be used to instruct rotor system 100 as to how to change the position of blades 120.

In the example of FIG. 9, cyclic trim assembly 500 may operate in three modes of operation. In the first mode of operation, clutch 515 is engaged, and trim motor 510 drives output shaft 590. This first mode of operation may represent, for example, operation of cyclic trim assembly 500 during auto-pilot operations. In this example, trim motor 510 may drive movement of output shaft 590 so as to drive movement of grip 230 of cyclic control assembly 200. Position measurement devices 530 and 570 may also measure how trim motor 510 drives output shaft 590 and communicate these measurements to rotor system 100.

In the second mode of operation, clutch 515 is disengaged, and the pilot drives output shaft 590 by way of cyclic control assembly 200. In this example, the pilot changes the position of output shaft 590, which may be measured by position measurement devices 530 and 570. Position measurement devices 530 and 570 may measure how the pilot drives output shaft 590 and communicate these measurements to rotor system 100.

In the third mode of operation, clutch 515 is engaged, and trim motor 510 holds its output arm at a trim position so as to provide a ground point for output shaft 590. In this example, the pilot may change the position of output shaft 590 about the trim position set by trim motor 510. When the pilot releases grip 230, grip 230 may move to the trim position corresponding to the position established by trim motor 510. In some embodiments, the first and third modes of operations may be combined such that trim motor 510 moves the trim position during operation.

Thus, trim motor 510 may provide cyclic force and/or trim to cyclic control assembly 200 through output shaft 590. In one example embodiment, trim motor 510 is a 28 volt DC permanent magnet motor. In operation, trim motor 510 may provide an artificial force feel for a flight control system about an anchor point, as will be explained in greater detail below. Clutch 515 provides a mechanism for engaging and disengaging trim motor 510.

Run-down damper 520 assists in moving output shaft 590 to a trim position set by trim motor 510. For example, run-down damper 520 may help dissipate energy stored in gradient spring 540 so as to reduce or eliminate the displacement or jolt feedback felt at grip 230 when the pilot releases grip 230 and grip 230 is allowed to return to the trim position.

Gradient spring 540 allows output shaft 590 to be moved relative to the position established by trim motor 510. If the pilot releases grip 230, gradient spring 540 may cause output shaft 590 to return to the position established by trim motor 510.

Damper 550 may help reduce inertial forces in cockpit control linkages. For example, damper 550 may help reduce the effect of pilot-induced oscillations and provide smoothness in cockpit controls. In this manner, damper 550 may provide some of the force/feel aspects felt in cyclic control assembly 200.

Shear device 560 provides a mechanism for internal jam alleviation in the event of a jam in cyclic trim assembly 500. For example, if trim motor 510 jams and prevents output shaft 590 from moving, the pilot may overcome the jam by providing sufficient force to shear output shaft 590 from trim motor 510 at shear device 560. Once output shaft 590 is sheared from trim motor 510, cyclic trim assembly 500 may operate in the first mode of operation with the pilot driving output shaft 590.

Position measurement devices 530 and 570 may represent any device operable to measure position of a shaft. In the example of FIG. 9, position measurement devices 530 and 570 are shown as rotary variable differential transformers (RVDTs). An RVDT is a type of electrical transformer used for measuring angular displacement. In one example, an RVDT may represent an electromechanical transducer that provides a variable alternating current (AC) output voltage that is linearly proportional to the angular displacement of its input shaft. When energized with a fixed AC source, the output signal is linear within a specified range over the angular displacement. In some embodiments, RVDTs utilize brushless, non-contacting technology to ensure long-life and reliable, repeatable position sensing with infinite resolution. Such reliable and repeatable performance may allow for accurate position sensing under extreme operating conditions.

In the example of FIG. 9, position measurement devices 530 are situated on opposite sides of gradient spring 540. In this example, pilot input may be determined by determining the difference in measurements from position measurement devices 530. For example, position measurement devices 570 may measure the position of output shaft 590 proximate to linkage 410 or 420, whereas position measurement devices 530 may measure differences in shaft rotation across gradient spring 540 as well as the position of shaft 590 proximate to trim motor 510. These measurements may indicate how far the pilot has rotated output shaft 590 away from the trim position established by trim motor 510.

In the example of FIG. 9, cyclic trim assembly 500 includes two position measurement devices 530 and three position measurement devices 570. In this example, multiple position measurement devices are provided for redundancy. For example, the three position measurement devices 570 may be associated with three flight control computers. Providing three flight control systems may protect rotorcraft 100 from certain systems failures.

Mechanical stops 580 limit the range of motion of shaft 220 by limiting the range of motion of output shaft 590. In one example embodiment, mechanical stops 580 mechanically restrict the travel limits of output shaft 590 to +/−35 degrees from a null position with a tolerance of +/−0.1 degrees. In some embodiments, mechanical stops 580 may represent positive non-jamming mechanical stops. In some embodiments, mechanical stops 580 may be capable of withstanding a max torque of 780 inch-pounds at output shaft 590 while on mechanical stops 580.

Teachings of certain embodiments recognize that mechanical stops 580 may provide the primary mechanism for limiting the range of motion of shaft 220. Although other components may have a limited range of motion (such as gimbals 260 and 270) and thus provide secondary limitations on the range of motion of shaft 220 (such as in the event of a failure of mechanical stops 580), mechanical stops 580 may provide the primary mechanism for limiting the range of motion of shaft 220. Teachings of certain embodiments recognize that mechanical stops 580 may be stronger than some other components in the system (such as gimbals 260 and 270) and therefore better suited to provide the primary mechanism for limiting the range of motion of shaft 220. In addition, teachings of certain embodiments recognize that providing the primary mechanism for limiting the range of motion of shaft 220 with cyclic trim assembly 500 may simplify the rigging procedure when installing cyclic control assemblies 200 and cyclic trim assemblies 500 in rotorcraft 100. Furthermore, teachings of certain embodiments recognize that providing mechanical stops 580 in cyclic trim assemblies 500 rather than cyclic control assemblies 200 may allow for a smaller post 210.

Figure 10:
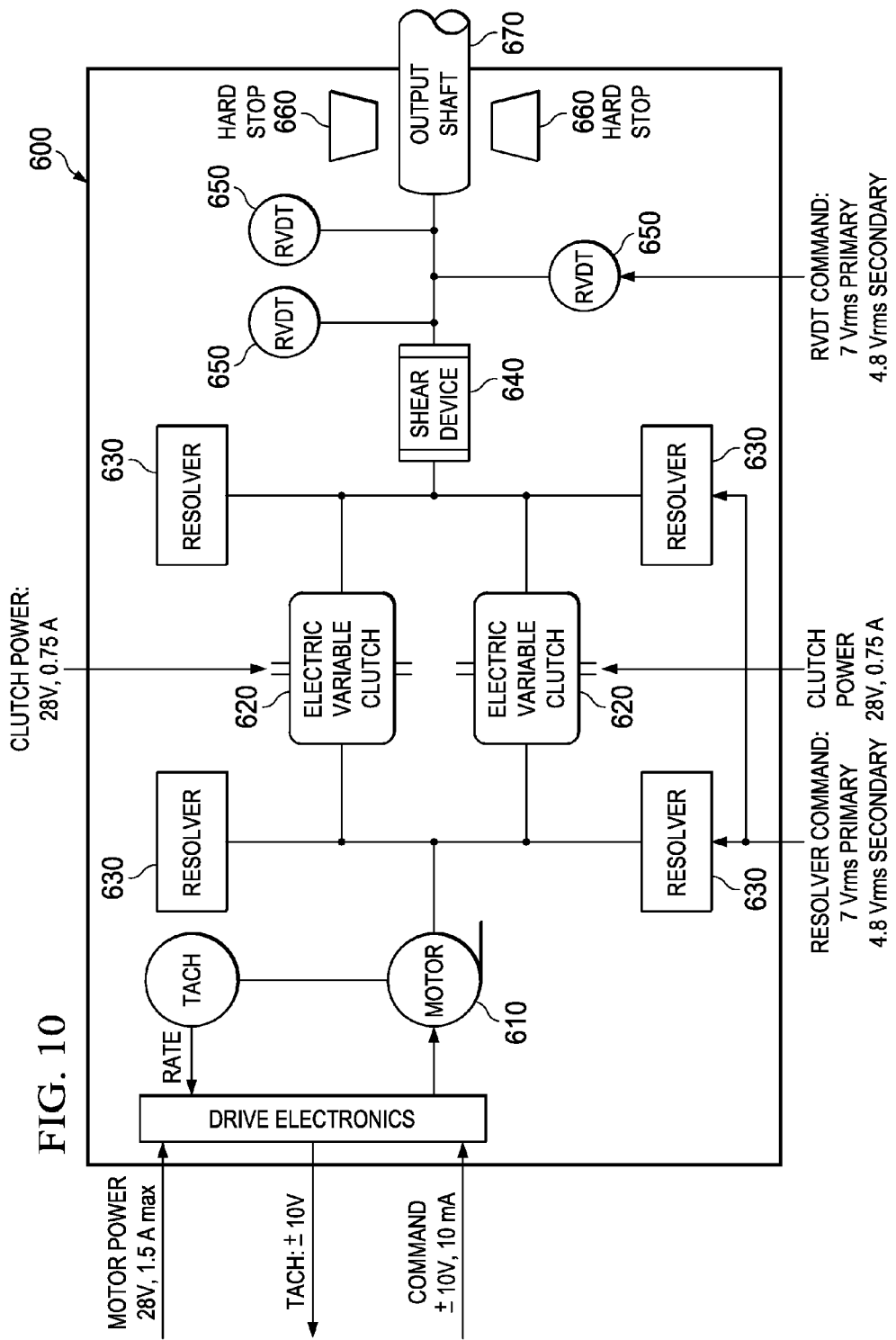
FIG. 10 shows a diagram representation of the collective trim assembly of FIG. 8 according to one example embodiment.

FIG. 10 shows a diagram representation of the collective trim assembly 600 of FIG. 8 according to one example embodiment. In this example, collective trim assembly 600 features a trim motor 610, clutches 620, resolvers 630, a shear device 640, position measurement devices 650, mechanical stop devices 660, and an output shaft 670. In the example of FIG. 8, shaft 670 may be coupled to linkages 430. Although shaft 670 may be described as a single shaft, teachings of certain embodiments recognize that shaft 670 may represent multiple pieces.

In operation, according to one example embodiment, output shaft 670 and collective control assemblies 300 are in mechanical communication such that movement of grip 330 results in movement of output shaft 670 and movement of output shaft 670 likewise results in movement of grip 330. Movement of output shaft 670 may be measured by position measurement devices 650. The measurements from measurement devices 650 may be used to instruct rotor system 100 as to how to change the position of blades 120.

In the example of FIG. 10, collective trim assembly 500 may operate in three modes of operation. In the first mode of operation, clutches 620 are engaged, and trim motor 610 drives output shaft 670. This first mode of operation may represent, for example, operation of collective trim assembly 600 during auto-pilot operations. In this example, trim motor 610 may drive movement of output shaft 670 so as to drive movement of grip 630 of collective control assembly 300. Position measurement devices 650 may also measure how trim motor 610 drives output shaft 670 and communicate these measurements to rotor system 100.

In the second mode of operation, clutches 620 are disengaged, and the pilot drives output shaft 670 by way of collective control assembly 300. In this example, the pilot changes the position of output shaft 670, which may be measured by position measurement devices 650. Position measurement devices 650 may measure how the pilot drives output shaft 670 and communicate these measurements to rotor system 100.

In the third mode of operation, clutches 620 are engaged, and trim motor 610 holds its output arm at a trim position so as to provide a ground point for output shaft 670. In this example, the pilot may change the position of output shaft 670 about the trim position set by trim motor 610. When the pilot releases grip 330, grip 330 may move to the trim position corresponding to the position established by trim motor 610. In some embodiments, the first and third modes of operations may be combined such that trim motor 610 moves the trim position during operation.

Thus, trim motor 610 may provide collective force and/or trim to collective control assembly 300 through output shaft 670. In one example embodiment, trim motor 610 is a 28 volt DC permanent magnet motor. In operation, trim motor 610 may provide an artificial force feel for a flight control system about an anchor point, as will be explained in greater detail below.

Clutches 620 provide a mechanism for engaging and disengaging trim motor 610. In the example of FIG. 10, clutches 620 are variable-friction clutches. Resolvers 630 measure slipping across clutches 620. In some embodiments, resolvers 630 may measure the amount of pilot effort by measuring the slipping across clutches 620. In combination, clutches 620 and resolvers 630 may provide force/feel characteristics back to collective control assembly 300.

In some embodiments, a planetary gear or other gear system may be provided between trim motor 610 and clutches 620/resolvers 630. In one example embodiment, a planetary gear is provided between trim motor 610 and the two clutches 620 left of resolvers 630 in FIG. 10. In this example embodiment, the two clutches 620 right of resolvers 630 may be removed.

Shear device 640 provides a mechanism for internal jam alleviation in the event of a jam in collective trim assembly 600. For example, if trim motor 610 jams and prevents output shaft 670 from moving, the pilot may overcome the jam by providing sufficient force to shear output shaft 670 from trim motor 610 at shear device 640. Once output shaft 670 is sheared from trim motor 610, collective trim assembly 600 may operate in the first mode of operation with the pilot driving output shaft 670.

Position measurement devices 650 may represent any device operable to measure position of a shaft. In the example of FIG. 10, position measurement devices 650 are shown as RVDTs. In addition, FIG. 10 shows collective trim assembly 600 as including three position measurement devices 650. In this example, multiple position measurement devices are provided for redundancy. For example, the three position measurement devices 650 may be associated with three flight control computers. Providing three flight control systems may protect rotorcraft 100 from certain systems failures.

Mechanical stops 660 limit the range of motion of shaft 320 by limiting the range of motion of output shaft 670. In some embodiments, mechanical stops 660 may represent positive non-jamming mechanical stops. Teachings of certain embodiments recognize that mechanical stops 660 may provide the primary mechanism for limiting the range of motion of shaft 320. Although other components may have a limited range of motion (such as components within post 310) and thus provide secondary limitations on the range of motion of shaft 320 (such as in the event of a failure of mechanical stops 660), mechanical stops 660 may provide the primary mechanism for limiting the range of motion of shaft 320. Teachings of certain embodiments recognize that mechanical stops 660 may be stronger than some other components in the system and therefore better suited to provide the primary mechanism for limiting the range of motion of shaft 320. In addition, teachings of certain embodiments recognize that providing the primary mechanism for limiting the range of motion of shaft 320 with collective trim assembly 600 may simplify the rigging procedure when installing collective control assemblies 300 and collective trim assemblies 600 in rotorcraft 100. Furthermore, teachings of certain embodiments recognize that providing mechanical stops 660 in collective trim assemblies 600 rather than collective control assemblies 300 may allow for a smaller post 310.

Thus, as shown with regards to FIGS. 3-10, aircraft such as rotorcraft 100 may be equipped with pilot flight controls such as cyclic control assemblies 200 and collective control assemblies 300, which may operate in conjunction with cyclic trim assemblies 500 and collective trim assemblies 600, respectively. In addition, teachings of certain embodiments recognize that aircraft such as rotorcraft 100 may be equipped with pedal assemblies for providing anti-torque control.

Figure 11A:
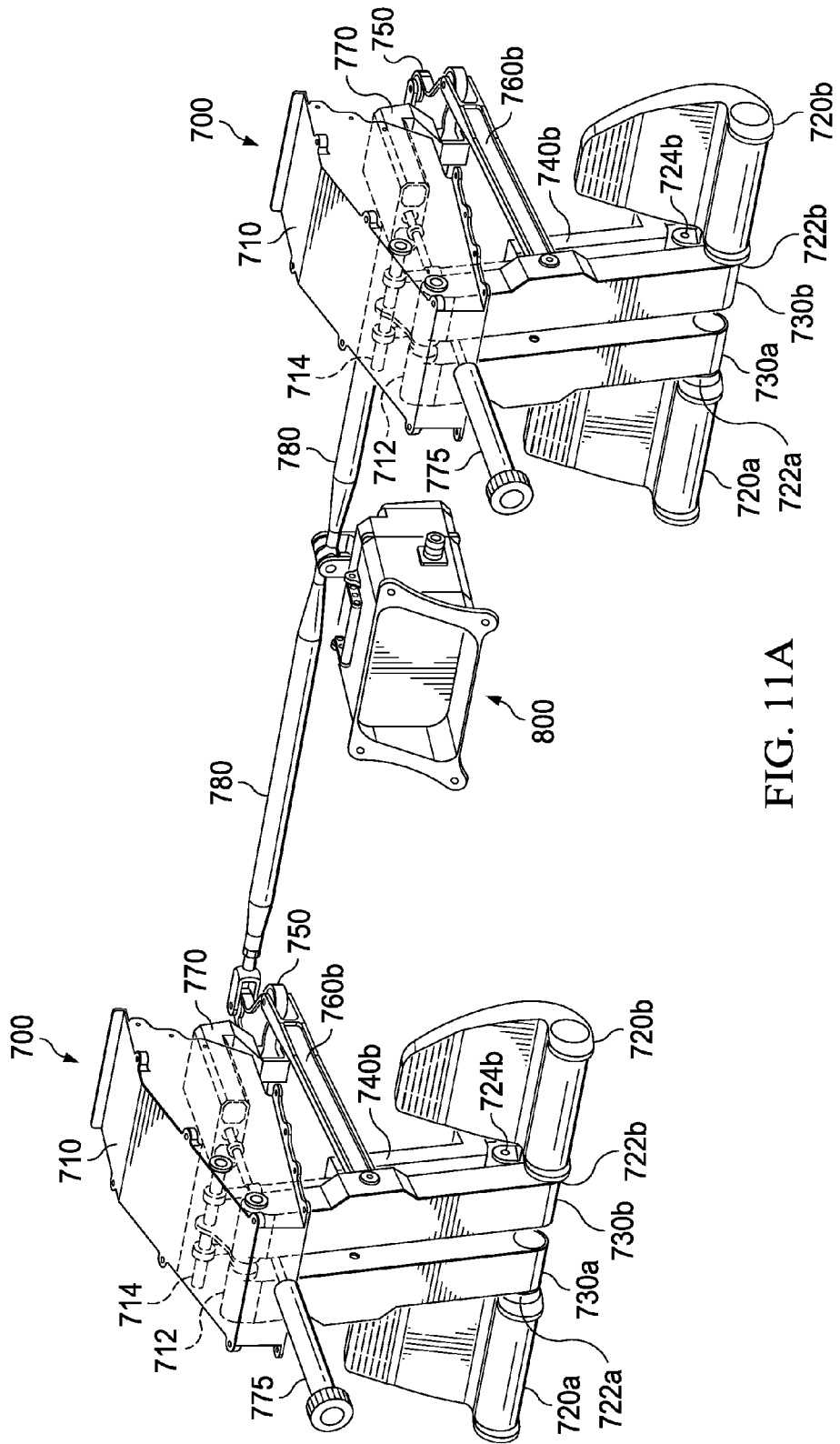
FIG. 11A shows a front perspective view of the pedal assemblies of FIG. 2.
Figure 11B:
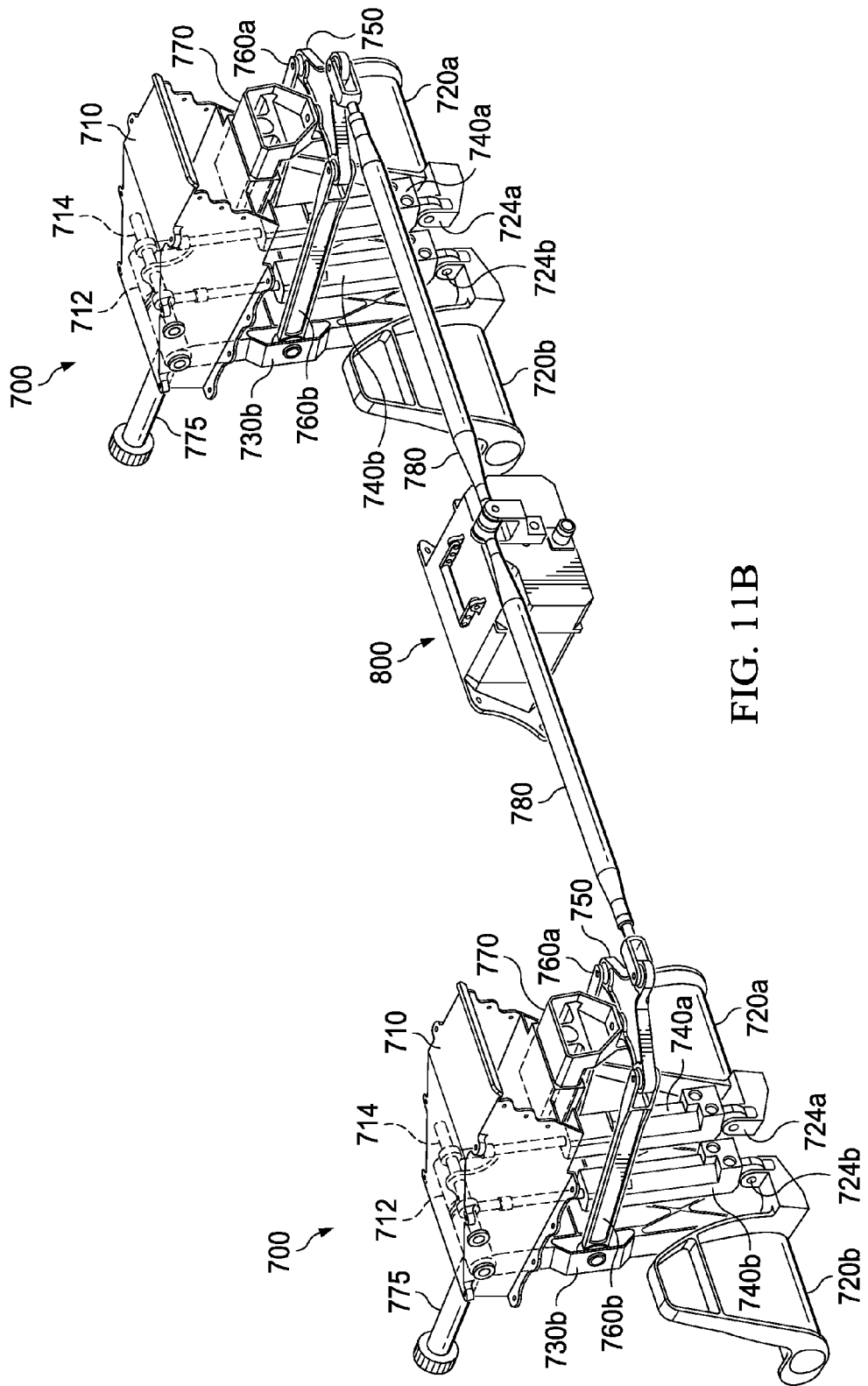
FIG. 11B shows a rear perspective view of the pedal assemblies of FIG. 11A.
Figure 11C:
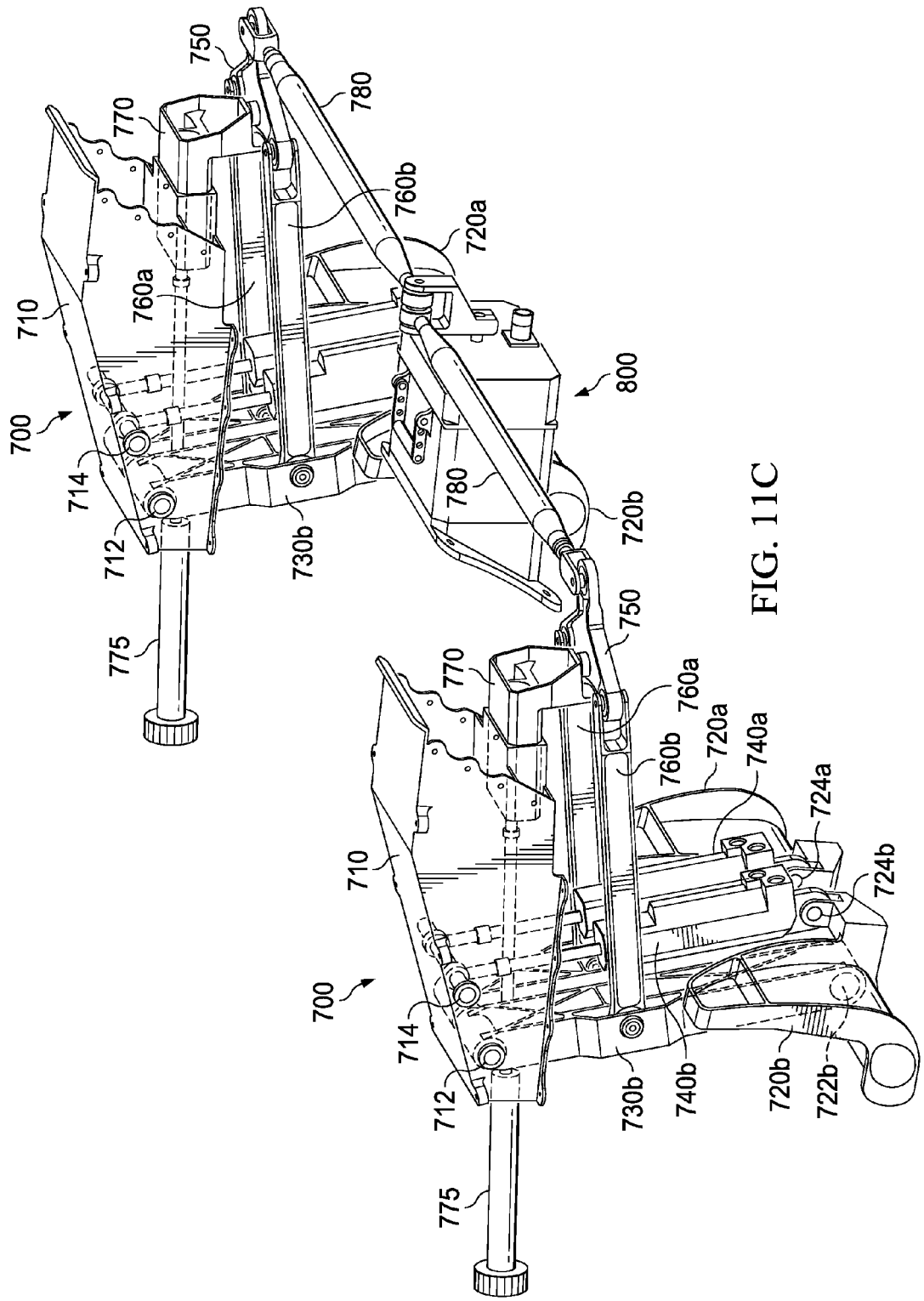
FIG. 11C shows a side perspective view of the pedal assemblies of FIG. 11A.
Figure 11D:
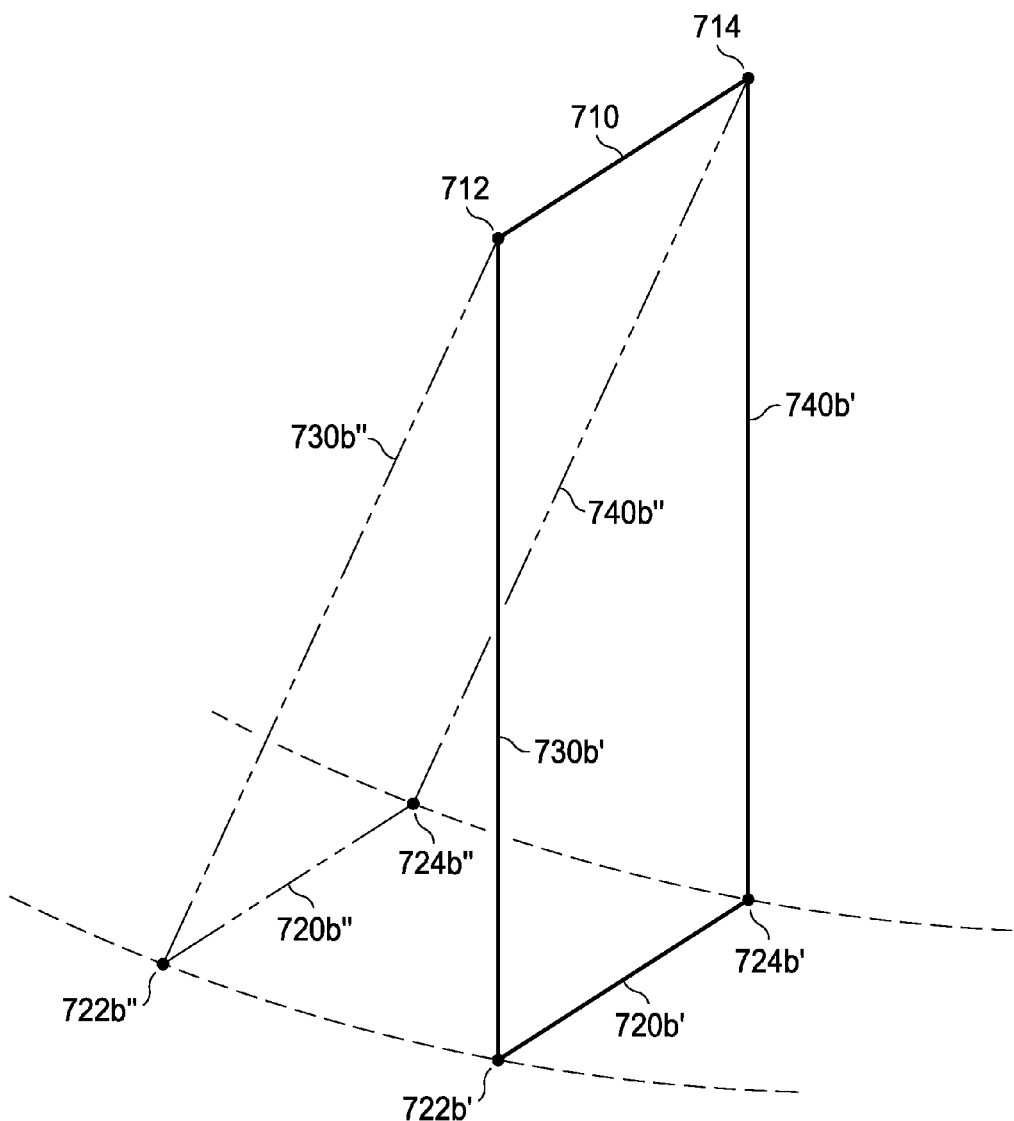
FIG. 11D shows a geometric view of components of the pedal assemblies of FIG. 11A.

FIGS. 11A-11D show pedal assemblies 700 and an anti-torque trim assembly 800 according to one example embodiment. FIGS. 11A-11C show front, rear, and side perspective views of pedal assemblies 700 and anti-torque trim assembly 800, and FIG. 11D show a geometric view of components of a pedal assembly 700.

As seen in FIGS. 11A-11C, each pedal assembly 700 may include an attachment assembly 710, pedals 720a and 720b, pedal linkages 730a and 730b, brake cylinders 740a and 740b, a rocker arm 750, pedal adjustment linkages 760a and 760b, a rocker adjustment member 770, and a pilot adjustment member 775. A trim linkage 780 may couple each pedal assembly 700 to anti-torque trim assembly 800.

In some embodiments, attachment assembly 710 may feature attachment positions 712 and 714. In the example of FIGS. 11A-11C, attachment positions 712 and 714 represent rods. In this example, pedal linkages 730a and 730b may couple to the rod associated with attachment position 712, and brake cylinders 740a and 740b may couple to the rod associated with attachment position 714. As used throughout, reference to a single attachment position (e.g., attachment position 712) may also refer to multiple attachment positions. For example, in some embodiments, attachment position 712 may represent two attachment positions: one associated with pedal linkage 730a and another associated with pedal linkage 730b. Such may be the case in the example of FIGS. 11A-11C, for example, if the rod associated with attachment position 712 is separated into two rod segments, one associated with pedal linkage 730a and another associated with pedal linkage 730b.

Pedals 720a and 720b may also feature attachment positions. In the example of FIGS. 11A-11C, pedals 720a features attachment positions 722a and 724a, and pedals 720b features attachment positions 722b and 724b. In this example, pedal linkage 730a may couple to attachment position 722a, brake cylinder 740a may couple to attachment position 724a, pedal linkage 730b may couple to attachment position 722b, and brake cylinder 740b may couple to attachment position 724b. In these examples, brake cylinders 740a and 740b may represent braking mechanism integrated into pedal assembly 700. Teachings of certain embodiments recognize that brake cylinders 740a and 740b may be of any suitable shape and, therefore, may not necessarily be cylindrical.

Pedal assembly 700 includes at least two mechanisms for moving pedals 720a and 720b. First, pedals 720a and 720b may move in opposite directions relative to one another. As seen in FIGS. 11A-11C, pedal linkages 730a and 730b are in mechanical communication via rocker arm 750 and pedal adjustment linkages 760a and 760b. Rocker arm 750 is operable to rotate about a point of rotation. In this example, pushing in pedal 720a causes pedal adjustment linkage 760a to rotate rocker arm 750, which in turn causes pedal adjustment linkage 760b to push out pedal 720b in a direction opposite that of pedal 720a.

In addition, rotating rocker arm 750 also causes trim linkage 780 to reposition a mechanical input associated with anti-torque assembly 800. In this manner, the pilot may mechanically communicate anti-torque commands to anti-torque assembly 800 by moving pedals 720a and 720b. Furthermore, trim linkages 780 couple adjacent pedal assemblies 700 together such pilot pedals and co-pilot pedals are in mechanical communication.

Each pedal assembly 700 also includes an additional mechanism for moving pedals 720a and 720b. In particular, the position of pedals 720a and 720b may be adjusted in the same direction. For example, pedals 720a and 720b may be adjusted in the same direction for pilot comfort. A pilot with long legs may wish to move both pedals 720a and 720b back, whereas a pilot with short legs may wish to bring both pedals 720a and 720b forward.

To adjust pedals 720a and 720b, the pilot may rotate pilot adjustment member 775. Pilot adjustment member 775 may be coupled to rocker adjustment member 770 such that rotation of pilot adjustment member 775 causes rocker adjustment member 770 to move forward and back. In the example of FIG. 11B, rocker adjustment member 770 moves forward and back by sliding in and out of an opening in attachment assembly 710. Rocker adjustment member 770 may be coupled to rocker arm 750 such that moving rocker adjustment member 770 forward and back may move the axis of rotation of rocker arm 750 without substantially rotating rocker arm 750. In this manner, the axis of rotation arm 750 may be relocated without providing anti-torque inputs to anti-torque assembly 800.

Moving rocker adjustment member 770 (and rocker arm 750) forward and back may cause pedal adjustment linkages 760a and 760b to move forward and back, which in response may cause pedal linkages 730a and 730b and pedals 720a and 720b to move forward and backward. Thus, teachings of certain embodiments recognize the capability to provide the pilot a mechanism for adjusting the position of pedals 720a and 720b. In addition, teachings of certain embodiments recognize that the pilot may independently adjust the position of pedals 720a and 720b without changing the pedal position for the co-pilot.

In each of these examples, pedals 720a and 720b move by rotating attachment positions 722a and 722b relative to attachment assembly 710. Although attachment positions 722a and 722b rotate relative to attachment assembly 710, teachings of certain embodiments recognize the ability to prevent the orientation of pedals 720a and 720b from changing as attachment positions 722a and 722b rotate. As will be explained in greater detail below, the geometric position of pedals 720a and 720b relative to attachment assembly 710 may fix the orientation of pedals 720a and 720b so long as brake cylinders 740a and 740b are not engaged.

In the example of FIGS. 11A-11D, the attachment positions of each pedal assembly 700 may form two parallelograms, one associated with each pedal. For example, attachment positions 712, 714, 722a, and 724a may represent the points of a parallelogram (with sides formed by attachment assembly 710, pedal 720a, pedal linkage 730a, and brake cylinder 740a). Similarly, attachment positions 712, 714, 722b, and 724b may represent the points of a parallelogram (with sides formed by attachment assembly 710, pedal 720b, pedal linkage 730b, and brake cylinder 740b).

Attachment positions 712, 714, 722a, 724a, 722b, and 724b may represent points of rotation. For example, pedal linkages 730a and 730b may rotate about attachment position 712. In this example, rotation of pedal linkages 730a and 730b may result in rotation by pedals 720a and 720b and brake cylinders 740a and 740b so as to maintain the parallelograms described above. In this example, attachment assembly 710 may be secured to an underside portion of an instrument panel inside the cockpit such that the location of attachment positions 712 and 714 may be considered fixed.

FIG. 11D shows a geometric representation of the rotation of pedal 720b from a first prime position to a second double-prime position according to one example embodiment. In this example, the line segment between attachment positions 722b and 724b remains parallel to the line segment between attachment positions 712 and 714 as pedal 720b moves from the first prime position to the second prime position. In this manner, the orientation of pedal 720b is fixed based on the fixed locations of attachment positions 712 and 714.

In these examples, pedal assembly 700 may form parallelograms if the overall length of brake cylinders 740a and 740b remain substantially equal to the overall length of pedal linkages 730a and 730b. Teachings of certain embodiments recognize, however, the ability to change the overall length of brake cylinders 740a and 740b as part of an aircraft braking mechanism. Aircraft braking may be used, for example, when an aircraft is on the ground.

In this example, a pilot may invoke the braking mechanism by pressing the tops of pedals 720a and 720b and causing pedals 720a and 720b to rotate about attachment positions 722a and 722b. Rotating pedals 720a and 720b about attachment positions 722a and 722b may increase the distance between attachment position 714 and attachment positions 724a and 724b, which may result in changing the overall length of brake cylinders 740a and 740b.

Teachings of certain embodiments recognize that fixing the orientation of pedals 720a and 720b may assist the pilot in providing both anti-torque and braking commands to pedal assembly 700. For example, if the orientation of pedals 720a and 720b is not fixed, then it may become difficult for the pilot to apply braking pressure to the top of pedals 720a and 720b when the pedals 720a and 720b are brought forward or pushed back.

Although the orientation of pedals 720a and 720b may be fixed, pedals 720a and 720b may travel along a path that closer to or away from the floorboard of the cockpit. For example, if pedals 720a and 720b travel along an arc, and the floorboard is flat, then the distance between pedals 720a/720b and the floorboard will not remain constant as pedals 720a and 720b travel.

Teachings of certain embodiments recognize, however, the ability to configure the travel path of pedals 720a and 720b to provide additional pilot comfort. One may assume, for example, that many pilots feel more comfortable with their heels resting on the floorboard and the balls of their feet positioned over the lower portion of the pedals. In addition, one may assume that pilots with longer legs have longer feet than pilots with shorter legs. Accordingly, teachings of certain embodiments recognize the ability to provide additional pilot comfort for a variety of pilots by configuring the travel arc of pedals 720a and 720b such that pedals 720a and 720b move somewhat closer to the floorboard when pedals 720a and 720b are brought towards the pilot and move somewhat away from the floorboard when pedals 720a and 720b are pushed away from the pilot.

Figure 12:
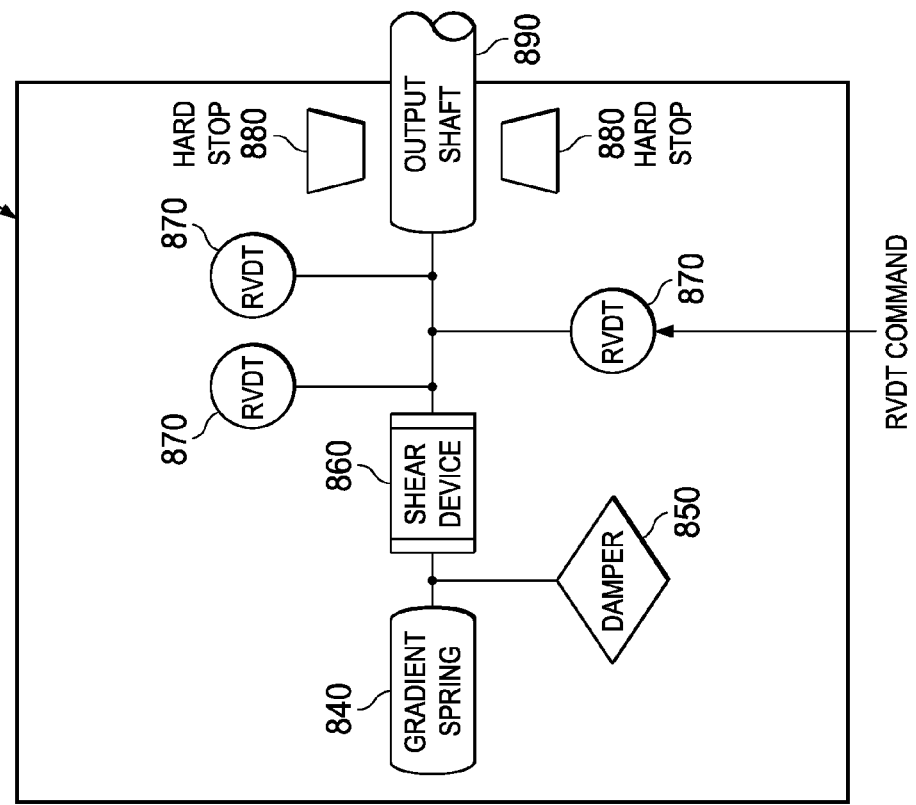
FIG. 12 shows a diagram representation of the anti-torque trim assembly of FIGS. 11A-11C according to one example embodiment.

As shown in FIGS. 11A-11C, pedal assemblies 700 may be in mechanical communication with anti-torque trim assembly 800. FIG. 12 shows a diagram representation of anti-torque trim assembly 800 according to one example embodiment. In this example, each anti-torque trim assembly 800 features a gradient spring 840, a damper 850, a shear device 860, position measurement devices 870, mechanical stop devices 880, and an output shaft 890. Although shaft 890 may be described as a single shaft, teachings of certain embodiments recognize that shaft 890 may represent multiple pieces.

In operation, according to one example embodiment, output shaft 890 and pedal assemblies 700 are in mechanical communication such that movement of pedals 720a and 720b results in movement of output shaft 890 and movement of output shaft 890 likewise results in movement of pedals 720a and 720b. Movement of output shaft 890 may be measured by position measurement devices 870. The measurements from measurement devices 870 may be used to instruct rotor system 100 as to how to change the position of blades 120' (or to change operation of an alternative anti-torque system).

Gradient spring 840 allows output shaft 890 to be moved relative to a fixed position representative of a mid-pedal position. If the pilot releases pedals 720a and 720b, gradient spring 840 may cause output shaft 890 to return to the fixed position.

Damper 850 may help reduce inertial forces in cockpit control linkages. For example, damper 850 may help reduce the effect of pilot-induced oscillations and provide smoothness in cockpit controls. In this manner, damper 850 may provide some of the force/feel aspects felt in pedal assemblies 700.

Shear device 860 provides a mechanism for internal jam alleviation in the event of a jam in anti-torque trim assembly 800. For example, output shaft 890 is prevented from moving from moving, the pilot may overcome the jam by providing sufficient force to shear output shaft 890 at shear device 860. Once output shaft 890 is sheared, anti-torque trim assembly 800 may operate with the pilot driving output shaft 890.

Position measurement devices 870 may represent any device operable to measure position of a shaft. In the example of FIG. 12, position measurement devices 870 are shown as RVDTs.

In the example of FIG. 9, anti-torque trim assembly 800 includes three position measurement devices 870. In this example, multiple position measurement devices are provided for redundancy. For example, the three position measurement devices 870 may be associated with three flight control computers. Providing three flight control systems may protect rotorcraft 100 from certain systems failures.

Mechanical stops 880 limit the range of pedals 720a and 720b by limiting the range of motion of output shaft 890. In some embodiments, mechanical stops 880 may represent positive non-jamming mechanical stops. Teachings of certain embodiments recognize that mechanical stops 880 may provide the primary mechanism for limiting the range of motion of pedals 720a and 720b.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
   a body;
   a power train coupled to the body and comprising a power source and a drive shaft coupled to the power source;
   a rotor system coupled to the power train and comprising a plurality of rotor blades;
   a control assembly, comprising:
      a post having a top, a bottom, and a body joining the top to the bottom, the body having an opening therethrough located above the bottom and directly below the top;
      at least one linkage disposed at least in part within the body;
      a grip; and
      a shaft having a first end coupled to the at least one linkage proximate to the body below the top and a second end opposite the first end coupled to the grip, the shaft passing through the opening in the body and positioning at least part of the grip directly over the top of the post without passing through the top; and
   a rotorcraft control system operable to communicate commands to the rotor system based on movements of the at least one linkage.

2. The rotorcraft of claim 1, wherein a gap exists between the grip and the top of the post.

3. The rotorcraft of claim 1, wherein the top of the post does not feature any macroscopic openings.

4. The rotorcraft of claim 1, wherein the grip is movable such that moving the grip mechanically communicates cyclic commands to the at least one linkage disposed at least in part within the body and coupled to the first end of the shaft.

5. The rotorcraft of claim 1, wherein the grip is movable such that moving the grip mechanically communicates collective commands to the at least one linkage disposed at least in part within the body and coupled to the first end of the shaft.

6. The rotorcraft of claim 5, wherein the collective commands comprise a command to change a pitch angle of the plurality of rotor blades.

7. The rotorcraft of claim 5, further comprising a second control assembly comprising:
   a post having a top, a bottom, and a body joining the top to the bottom;
   at least one linkage disposed at least in part within the body;
   a grip; and
   a shaft having a first end coupled to the at least one linkage proximate to the body below the top and a second end opposite the first end coupled to the grip, the shaft positioning at least part of the grip directly over the top of the post, wherein the grip of the second control assembly is movable such that moving the grip of the second control assembly mechanically communicates cyclic commands to the at least one linkage of the second control assembly.

8. The rotorcraft of claim 1, the rotor system comprising:
   a hub coupled to the drive shaft;
   the plurality of rotor blades coupled to the hub;
   a swashplate positioned about the drive shaft; and
   a plurality of pitch links coupled between the swashplate and the hub corresponding to the rotor blade.

9. The rotorcraft of claim 8, wherein the grip is movable such that moving the grip mechanically communicates to the at least one linkage a command to tilt the swashplate in a direction corresponding to a movement direction of the grip.

10. A control assembly, comprising:
  a post having a top, a bottom, and a body joining the top to the bottom, the body having an opening therethrough located above the bottom and directly below the top;
  a grip; and
  a shaft having a first end coupled proximate to the body below the top and a second end opposite the first end coupled to the grip, the shaft passing through the opening in the body and positioning at least part of the grip directly over the top of the post without passing through the top.

11. The control assembly of claim 10, wherein:
  the control assembly further comprises at least one linkage disposed at least in part within the body; and
  the first end of the shaft is coupled to the at least one linkage.

12. The control assembly of claim 10, wherein a gap exists between the grip and the top of the post.

13. The control assembly of claim 10, wherein the top of the post does not feature any macroscopic openings.

14. The control assembly of claim 10, wherein the grip is movable such that moving the grip mechanically communicates cyclic commands to at least one linkage disposed at least in part within the body and coupled to the first end of the shaft.

15. The control assembly of claim 10, wherein the cyclic commands comprise a command to tilt a rotorcraft swashplate in a direction corresponding to a movement direction of the grip.

16. The control assembly of claim 10, wherein the grip is movable such that moving the grip mechanically communicates collective commands to at least one linkage disposed at least in part within the body and coupled to the first end of the shaft.

17. The control assembly of claim 16, wherein the collective commands comprise a command to change a pitch angle of a plurality of rotorcraft main rotor blades.

18. A method of communicating flight control inputs, comprising:
  supporting at least part of a grip over a top of a post, the post having the top, a bottom, and a body joining the top to the bottom, by providing a shaft passing through an opening in the body and positioning at least part of the grip directly over the top of the post without passing through the top, the body having the opening therethrough located above the bottom and directly below the top;
  receiving a movement of the grip; and
  in response to the movement of the grip, transmitting a flight control command.

19. The method of claim 18, wherein transmitting a flight control command comprises moving at least one linkage disposed at least in part within the grip.

20. The method of claim 18, wherein supporting at least part of a grip over a top of a post further comprises providing a gap between the grip and the top of the post.

21. The method of claim 18, wherein the flight control command is a lateral or longitudinal cyclic command.

22. The method of claim 18, wherein the flight command comprises a command to tilt a rotorcraft swashplate in a direction corresponding to a movement direction of the grip.

23. The method of claim 18, wherein the flight control command is a collective command.

24. The method of claim 18, wherein the flight command comprises a command to change a pitch angle of a plurality of rotorcraft main rotor blades.

* * * * *